(12) United States Patent
Nashimoto et al.

(10) Patent No.: US 12,320,919 B2
(45) Date of Patent: Jun. 3, 2025

(54) RADAR DEVICE AND NON-TRANSITORY COMPUTER-READABLE RECORDING MEDIUM

(71) Applicant: Mitsubishi Electric Corporation, Tokyo (JP)

(72) Inventors: Shoei Nashimoto, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 508 days.

(21) Appl. No.: 17/741,930

(22) Filed: May 11, 2022

(65) Prior Publication Data

US 2022/0276337 A1    Sep. 1, 2022

Related U.S. Application Data

(63) Continuation of application No. PCT/JP2020/000951, filed on Jan. 15, 2020.

(51) Int. Cl.
*G01S 7/35* (2006.01)
*G01S 13/06* (2006.01)
*G01S 13/58* (2006.01)

(52) U.S. Cl.
CPC ............ *G01S 7/35* (2013.01); *G01S 13/06* (2013.01); *G01S 13/584* (2013.01)

(58) Field of Classification Search
CPC ........... G01S 7/35; G01S 13/06; G01S 13/584
See application file for complete search history.

(56) References Cited

U.S. PATENT DOCUMENTS

| | | | | |
|---|---|---|---|---|
| 9,575,160 | B1* | 2/2017 | Davis | G01S 7/35 |
| 9,753,132 | B1* | 9/2017 | Bordes | G01S 13/325 |
| 9,846,228 | B2* | 12/2017 | Davis | G01S 7/0233 |
| 10,261,179 | B2* | 4/2019 | Davis | G01S 13/87 |

(Continued)

FOREIGN PATENT DOCUMENTS

CA   2 467 428 A1   5/2003
DE   10 2017 200 383 A1   7/2018
(Continued)

OTHER PUBLICATIONS

German Office Action for German Application No. 11 2020 005 567.1, dated Jul. 8, 2024, with English translation.

(Continued)

*Primary Examiner* — Marcus E Windrich
(74) *Attorney, Agent, or Firm* — Birch, Stewart, Kolasch & Birch, LLP

(57) ABSTRACT

A radar device (10) includes a signal generation unit (100) to generate a signal as an original signal, a pseudo-random number generation unit (102) to generate a pseudo-random number sequence formed of a pseudo-random number, a true random number generation unit (101) to generate a true random number sequence formed of a true random number, a modulation code synthesizing unit (103) to generate a modulation code sequence for use in modulating a signal phase by synthesizing the pseudo-random number sequence and the true random number sequence, and a phase modulation unit (104) to generate a transmission signal by modulating a phase of the original signal by using the modulation code sequence.

15 Claims, 18 Drawing Sheets

(56) References Cited

U.S. PATENT DOCUMENTS

| | | | | |
|---|---|---|---|---|
| 11,474,225 | B2* | 10/2022 | Dent | G01S 13/106 |
| 2003/0095662 | A1* | 5/2003 | Jarosinski | H04J 13/0022 |
| | | | | 380/268 |
| 2017/0160380 | A1 | 6/2017 | Searcy et al. | |
| 2019/0377083 | A1 | 12/2019 | Koerber et al. | |

FOREIGN PATENT DOCUMENTS

| | | |
|---|---|---|
| EP | 1 444 857 A1 | 8/2004 |
| EP | 3 179 288 A1 | 6/2017 |
| JP | 8-146128 A | 6/1996 |
| JP | 2002-14159 A | 1/2002 |
| JP | 2002-152193 A | 5/2002 |
| JP | 2003-131867 A | 5/2003 |
| JP | 2005-510747 A | 4/2005 |
| JP | 2016-148634 A | 8/2016 |
| WO | WO 03/045106 A1 | 5/2003 |

OTHER PUBLICATIONS

International Search Report, issued in PCT/JP2020/000951, dated Mar. 31, 2020.
Miura et al., "A Low-Cost Replica-Based Distance-Spoofing Attack on mmWave FMCW Radar", Workshop on Attacks and Solutions in Hardware Security (ASHES 2019), Nov. 15, 2019, London, United Kingdom, pp. 95-100.
Suzuki et al., "Randomizing Chirp Signal in Frequency Modulated Continuous Wave Radar". SCIS2018, 2018 Symposium on Cryptography and Information Security, Niigata, Japan, Jan. 23-26, 2018, The Institute of Electronics, Information and Communication Engineers.
Wada, "Study on Spectral Diffuse Communication Method Using Walsh-Hadamard", Nagoya University, Jan. 1998, pp. 24-26.
Written Opinion of the International Searching Authority, issued in PCT/JP2020/000951, dated Mar. 31, 2020.
Chinese Office Action and Search Report for Chinese Application No. 202080091979.1, dated Nov. 29, 2024, with English translation.

* cited by examiner

RADAR DEVICE AND NON-TRANSITORY COMPUTER-READABLE RECORDING MEDIUM

CROSS REFERENCE TO RELATED APPLICATIONS

This application is a Continuation of PCT International Application No. PCT/JP2020/000951, filed on Jan. 15, 2020, which is hereby expressly incorporated by reference into the present application.

TECHNICAL FIELD

The present disclosure relates to a radar device, radar operation method, and radar operation program.

BACKGROUND ART

A radar is a device which irradiates electric waves to a target and measures reflected waves from the target, thereby measuring a relative distance between the radar and the target, a relative speed of the target, or the like. An FMCW (Frequency Modulated Continuous Wave) scheme is one of radar schemes, and is inexpensive yet excellent in ability of measuring a distance and speed. In particular, a fast FMCW scheme has a higher resolution than the conventional slow FMCW scheme. The fast FMCW scheme is a scheme in which the sweep time of a chirp signal is relatively short, that is, several us.

A radar using a MIMO (Multiple Input Multiple Output) scheme can measure an angle, and can improve angular resolution. The MIMO scheme is a scheme using a plurality of transmission antennas and a plurality of reception antennas.

Also, there is a method of modulating a phase to avoid mutual interference of transmission waves from the plurality of transmission antennas. A technique has been conventionally known which modulates a phase by allocating each element of a pseudo-random number sequence with high autocorrelation such as an M sequence or Gold sequence to 0 or π.

In operation of the radar, deception is a threat. Deception is an attack of making an erroneous measurement value by externally inserting an electric wave disguised as reflected waves into the radar. Non-Patent Literature 1 discloses, as a deception countermeasure, a measure scheme of modulating a chirp of a slow FMCW radar by using a relatively simple pseudo-random number to detect an attack by using the frequency and amplitude of a beat signal. The slow FMCW radar is a radar using a slow FMCW scheme.

CITATION LIST

Non-Patent Literature

Non-Patent Literature 1: Suzuki, Nashimoto, et al., "Randomizing Chirp Signal in Frequency Modulated Continuous Wave Radar", SCIS2018, 2018 Symposium on Cryptography and Information Security, Niigata, Japan, Jan. 23-26, 2018, The Institute of Electronics, Information and Communication Engineers.

SUMMARY OF INVENTION

Technical Problem

To determine whether deception is present, the slow FMCW radar is required to change (modulate) the slope of an FMCW signal up or down.

The fast FMCW radar is required to collectively process a plurality of waveforms to measure the position or speed of a target. The fast FMCW radar is a radar using a fast FMCW scheme. Since the frequency of a beat signal changes in accordance with the slope of an FMCW signal, if the fast FMCW radar determines whether deception is present in a manner similar to that of the slow FMCW radar, this adversely affects measurement of the position, speed, or the like of the target.

Also, since the pseudo-random number sequence such as an M sequence or Gold sequence conventionally used for the MIMO radar to modulate a phase does not have many variations, it has been known that upon observation midway, a value appearing next can be guessed. The MIMO radar is a radar using an MIMO scheme.

Therefore, relatively simple interference countermeasures do not serve as countermeasures against deception attacks such as guessing a sequence used for phase modulation.

An object of the present disclosure is to provide a radar device capable of reducing the risk that the sequence used for phase modulation is guessed, the radar device having implemented therein measures not adversely affecting measurement of the position, speed, or the like of the target. The radar device of the present disclosure is typically a radar device adopting a fast FMCW scheme.

Solution to Problem

Advantageous Effects of Invention

According to the radar device of the present disclosure, it is possible to provide a radar device capable of reducing the risk that the sequence used for phase modulation is guessed, the radar device having implemented therein measures not adversely affecting measurement of the position, speed, or the like of the target.

DESCRIPTION OF EMBODIMENTS

Embodiment 1

In the following, the present embodiment is described in detail with reference to the drawings.
\*\*\*Description of Structure\*\*\*

A radar device 10 according to the present embodiment typically adopts a fast FMCW (Frequency Modulated Continuous Wave) scheme and also adopts a MIMO (Multiple Input Multiple Output) scheme. The MIMO scheme is a scheme of using a plurality of transmission antennas and a plurality of reception antennas.

Figure 1:
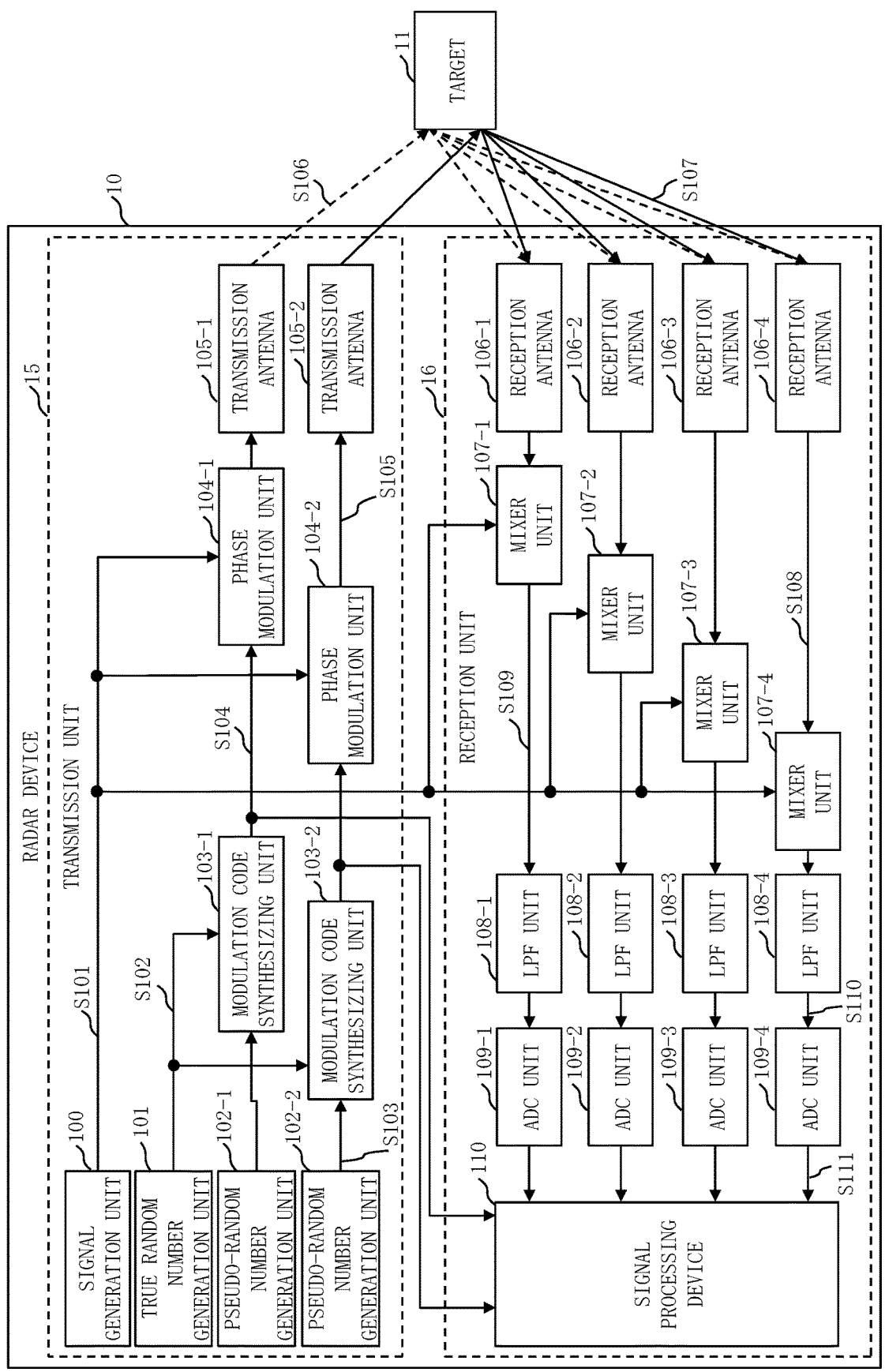
FIG. 1 illustrates an example of structure of a radar device 10 according to Embodiment 1.

FIG. 1 illustrates an example of structure of the radar device 10 according to the present embodiment. Black circles in this drawing represent that a plurality of lines in touch with black circles are mutually connected. When no black circle is rendered at a location where a plurality of lines cross, the plurality of lines are not connected.

As illustrated in this drawing, the radar device 10 includes a transmission unit 15 and a reception unit 16.

The transmission unit 15 includes a signal generation unit 100, a true random number generation unit 101, a plurality of pseudo-random number generation units 102, a plurality of modulation code synthesizing units 103, a plurality of phase modulation units 104, and a plurality of transmission antennas 105. In this drawing, for identification of each of the transmission antennas 105, they are denoted as "105-1" and "105-2". The same goes for the plurality of other components included in each radar device described in the specification.

The number of pseudo-random number generation units 102, the number of modulation code synthesizing units 103, and the number of phase modulation units 104 each match the number of transmission antennas 105.

The signal generation unit 100, the true random number generation unit 101, the pseudo-random number generation units 102, the modulation code synthesizing units 103, and the phase modulation units 104 are each typically comprised of a circuit. One circuit may implement a plurality of components of the radar device 10. Alternatively, a plurality of circuits may implement one component of the radar device 10. Each component described as being comprised of a circuit may be comprised of a computer. Each computer described in the specification may be formed of a plurality of computers. The computer may convert a digital signal to an analog signal as appropriate and may convert an analog signal to a digital signal as appropriate.

The signal generation unit 100 generates a signal as an original signal S101.

The true random number generation unit 101 generates a true random number sequence S102 formed of true random numbers of one bit or more.

The true random number generation unit 101 may generate a true random number of one bit by converting an extreme value of a beat signal S110 to a binary number. The true random number generation unit 101 may generate a true random number of one bit by generating random number bits respectively corresponding to a plurality of LPF units 108 by using the beat signals S110 respectively corresponding to the plurality of LPF units 108 and performing exclusive OR operation or exclusive NOR operation by using the generated random number bits.

The pseudo-random number generation unit 102 generates a pseudo-random number sequence S103 formed of pseudo-random numbers of one bit or more.

The modulation code synthesizing unit 103 synthesizes a pseudo-random number sequence S103 and a true random number sequence S102 to generate a modulation code sequence S104 for use in signal phase modulation and including components derived from the true random number sequence S102. The components derived from the true random number sequence S102 are influences of the true random number sequence S102 included in the elements. The modulation code sequence S104 is the modulation code sequence S104 such that two modulation code sequences S104 are synthesized to cause the components derived from the true random number sequence S102 to disappear. Two modulation code sequences S104 may be the same or may be different from each other.

Note that a scheme of synthesizing the pseudo-random number sequence S103 and the true random number sequence S102 and a scheme of synthesizing two modulation code sequences S104 may be different.

The modulation code synthesizing unit 103 may generate a modulation code sequence by performing exclusive OR operation or exclusive NOR operation.

An element of a sequence refers to a minimum unit configuring the sequence. The sequence is formed of, as a specific example, an array. In this example, an element of a sequence is an element of an array.

The phase modulation unit 104 generates a transmission signal S105 by modulating the phase of the original signal S101 by using the modulation code sequence S104.

The transmission antenna 105 converts the transmission signal S105 to a transmission wave S106 and transmits the transmission wave S106.

The reception unit 16 includes a plurality of reception antennas 106, a plurality of mixer units 107, the plurality of LPF (Low Pass Filter) units 108, a plurality of ADC (Analog-to-Digital Converter) units 109, and a signal processing device 110. The LPF units are also referred to as low-pass filter units.

The number of mixer units 107, the number of LPF units 108, and the number of ADC units 109 each match the number of reception antennas 106.

The mixer units 107, the LPF units 108, and the ADC units 109 are each typically comprised of a circuit.

The reception antenna 106 receives a reception wave S107 corresponding to the transmission wave S106, and converts the reception wave S107 to a reception signal S108.

The mixer unit 107 generates a mixer output signal S109 by mixing the original signal S101 and the reception signal S108.

The LPF unit 108 generates the beat signal S110 by extracting a low frequency wave of the mixer output signal S109.

The original signal S101 is a signal generated by the signal generation unit 100. The true random number sequence S102 is a sequence formed of signals generated by the true random number generation unit 101. The pseudo-random number sequence S103 is a sequence formed of signals generated by the pseudo-random number generation unit 102. The modulation code sequence S104 is a sequence formed of signals generated by the modulation code synthesizing unit 103 synthesizing the true random number sequence S102 and the pseudo-random number sequence S103. The transmission signal S105 is a signal obtained by the phase modulation unit 104 modulating the original signal S101 by using the modulation code sequence S104.

Note that, as for the bits configuring the true random number sequence S102, it is assumed that either one of the number of bits with their values being 0 and the number of bits with their values being 1 is not significantly larger than the other.

The transmission wave S106 is a signal transmitted from the transmission antenna 105. The reception wave S107 is the transmission wave S106 reflected from a target 11 and is a signal reaching the reception antenna 106.

The number of transmission waves S106 matches the number of transmission antennas 105. A maximum value of the number of reception waves S107 matches a number obtained by multiplying the number of transmission antennas 105 by the number of reception antennas 106. For example, as in FIG. 1, when the radar device 10 includes two transmission antennas 105 and four reception antennas 106, eight reception waves S107 are present at maximum. The transmission antenna 105 and the reception antenna 106 may be configured of one antenna.

The reception signal S108 is a signal generated by the reception antenna 106 using the reception wave S107. The reception signal S108 is a signal corresponding to the transmission signal S105. The mixer output signal S109 is a signal obtained by the mixer unit 107 performing mixing by using the original signal S101 and the reception signal S108. The beat signal S110 is a signal obtained by the LPF unit 108 performing filtering. A digital signal S111 is a signal obtained by the ADC unit 109 performing digitalization.

Figure 2:
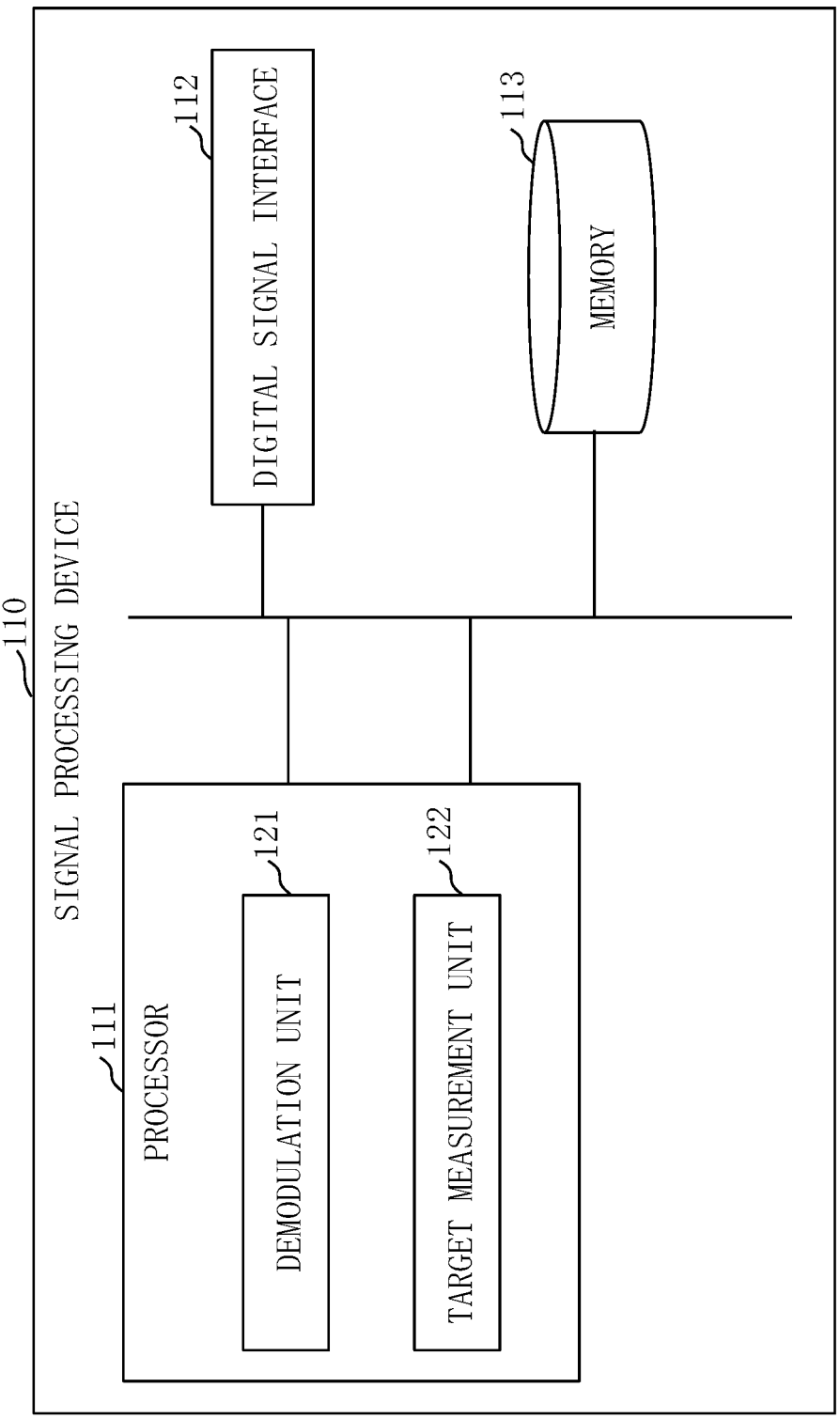
FIG. 2 illustrates an example of hardware structure of a signal processing device 110 according to Embodiment 1.

FIG. 2 illustrates an example of hardware structure of the signal processing device 110. The signal processing device 110 is a general computer.

As illustrated in this drawing, the signal processing device 110 includes a processor 111, a digital signal interface 112, and a memory 113 as hardware. The pieces of hardware included in the signal processing device 110 are each connected via signal lines.

As illustrated in this drawing, the signal processing device 110 includes a demodulation unit 121 and a target measurement unit 122 as functional components.

The processor 111 is an IC (Integrated Circuit) which performs an arithmetic operation process, and controls hardware included in the signal processing device 110. As a specific example, the processor 111 is a CPU (Central Processing Unit), DSP (Digital Signal Processor), or GPU (Graphics Processing Unit).

The digital signal interface 112 is, as a specific example, a serial communication interface. As a specific example, the serial communication interface is an SPI (Serial Peripheral Interface), UART (Universal Asynchronous Receiver Transmitter), or I2C (Inter-Integrated Circuit). The digital signal interface 112 is used to connect the signal processing device 110 and external hardware together. The external hardware includes the modulation code synthesizing unit 103 and the ADC unit 109.

The memory 113 is formed of at least one of a volatile storage device and a non-volatile storage device. The volatile storage device is, as a specific example, a RAM (Random Access Memory). The non-volatile storage device is, as a specific example, a ROM (Read Only Memory), HDD (Hard Disk Drive), or flash memory.

A cache which the processor 111 has and so forth may be included in the memory 113.

The demodulation unit 121 demodulates the beat signal S110 by using the modulation code sequence S104.

The functions of the demodulation unit 121 and the target measurement unit 122 are implemented by a program. The program is stored in the memory 113 and is executed in the processor 111.

Each program described in the specification may be recorded on a non-volatile recording medium as being readable by a computer. The non-volatile recording medium is, as a specific example, an optical disc or flash memory.

A radar operation program is a general term of a program for use in operating each radar device described in the specification. The radar operation program may be provided as a program product.

*Description of Operation*

The operation procedure of the radar device 10 corresponds to a radar operation method. Also, a program of achieving the operation of the radar device 10 corresponds to the radar operation program.

Figure 3:
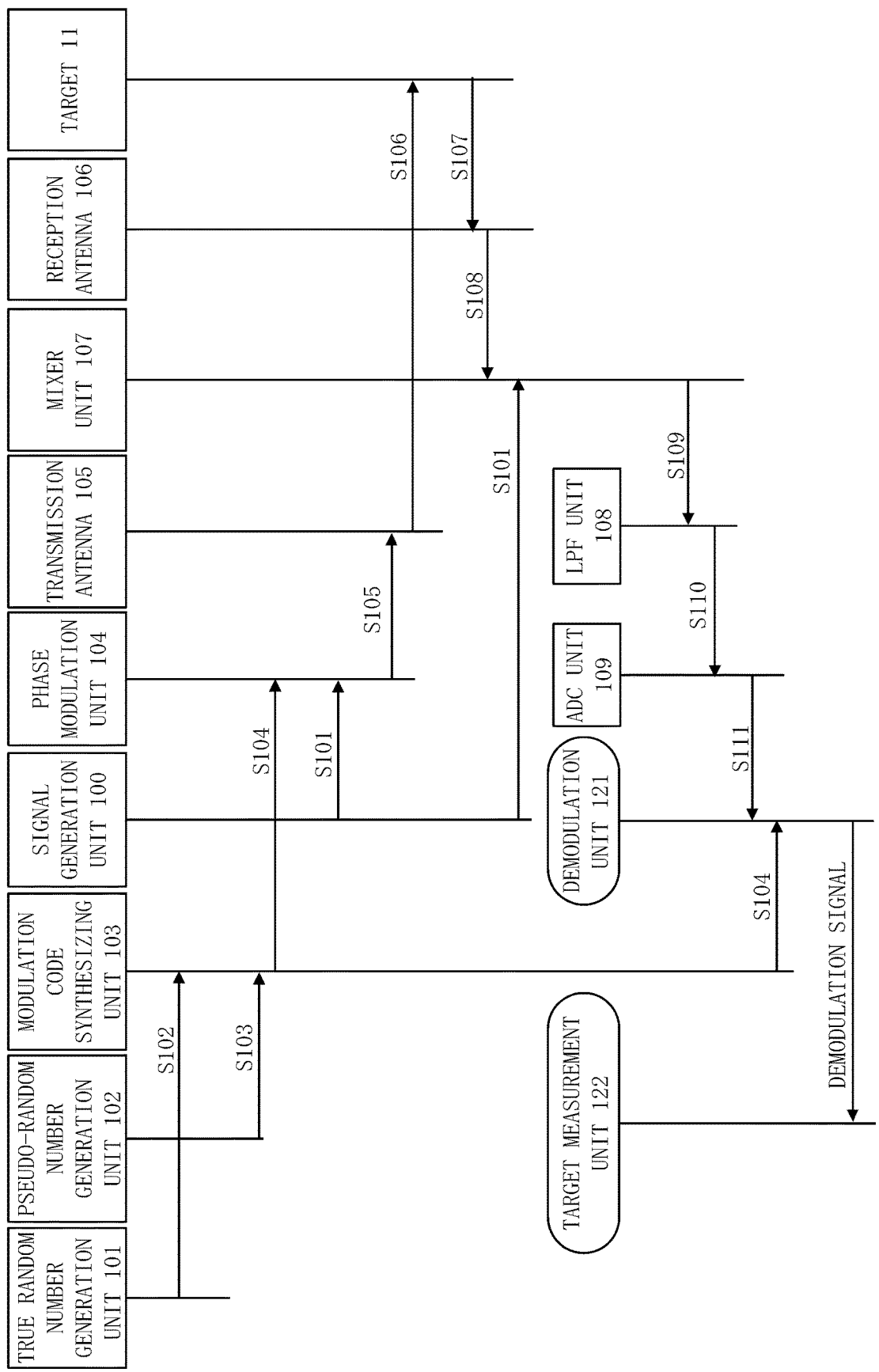
FIG. 3 is a sequence diagram illustrating the operation of the radar device 10 according to Embodiment 1.

FIG. 3 is a sequence diagram illustrating one example of operation of the radar device 10. With reference to this drawing, the operation of the radar device 10 is described.

The true random number generation unit 101 generates a true random number sequence S102, and transmits the true random number sequence S102 to the modulation code synthesizing unit 103. The true random number sequence S102 is a sequence formed of true random numbers. The true random numbers may include a complex pseudo-random number. The complex pseudo-random number is a pseudo-random number with its random number value difficult to guess. The complex pseudo-random number is, as a specific example, a random number generated by using a Mersenne twister or PCG (Permuted Congruential Generator).

The true random number generation unit 101 is, for example, a ring oscillator with an odd number of oscillators connected in a shape of a string of beads. The true random number sequence S102 is, for example, a sequence of "1, 1, 1, 0, 0, . . . ".

The pseudo-random number generation unit 102 generates a pseudo-random number sequence S103, and transmits the pseudo-random number sequence S103 to the modulation code synthesizing unit 103. The pseudo-random number sequence S103 is a sequence formed of pseudo-random numbers.

The pseudo-random number generation unit 102 is, for example, an M-sequence or Gold-sequence generator. The pseudo-random number sequence S103 is a sequence of bits, for example, "1, 0, 1, 0, 1, . . . ".

The modulation code synthesizing unit 103 generates a modulation code sequence S104 by using the true random number sequence S102 and the pseudo-random number sequence S103, and transmits the modulation code sequence S104 to the phase modulation unit 104 and the demodulation unit 121. The sequence lengths of the true random number sequence S102, the pseudo-random number sequence S103, and the modulation code sequence S104 are all equal. The sequence length represents the number of elements which the sequence has. The modulation code sequence S104 is, for example, a sequence formed of elements of one bit, "0, 1, 0, 0, 1, . . . ". In the following, each element of the modulation code sequence S104 is assumed to be an element of one bit.

The modulation code synthesizing unit 103 synthesizes the true random number sequence S102 and the pseudo-random number sequence S103 by using, as a specific example, XOR operation or XNOR operation. XOR operation is also referred to as exclusive disjunction operation. XNOR operation is also referred to as negation of exclusive disjunction operation.

As a specific example, as illustrated in FIG. 1, consider a case in which two pseudo-random number generation units 102 are present. The true random number sequence S102 is taken as r. The pseudo-random number sequence S103 generated by the pseudo-random number generation unit 102-1 is taken as m1. The pseudo-random number sequence S103 generated by the pseudo-random number generation unit 102-2 is taken as m2.

When the modulation code synthesizing unit 103 synthesizes r and m1 and r and m2 each by using XOR operation, the modulation code sequence S104 can be represented as XOR(r, m1) and XOR(r, m2), respectively. In this case, each element of the modulation code sequence S104 receives an influence of the true random number sequence S102. That is, the modulation code sequence S104 includes components derived from the true random number sequence S102.

Expression (1) represents that both are synthesized by performing XOR operation. From the last term of expression (1), r disappears. That is, each of XOR(r, m1) and XOR(r, m2) is the modulation code sequence S104 in which the components derived from the true random number sequence S102 disappear by synthesizing two modulation code sequences S104. Note that expression (1) corresponds to a case in which demodulation is performed by using a modulation code sequence S104 different from the modulation code sequence S104 used for modulation.

$$\text{XOR}(\text{XOR}(r,m1),\text{XOR}(r,m2))=\text{XOR}(\text{XOR}(m1,m2),\text{XOR}(r,r))=\text{XOR}(m1,m2) \quad (1)$$

The signal generation unit 100 transmits the original signal S101 to the phase modulation unit 104 and the mixer unit 107.

The phase modulation unit 104 generates the transmission signal S105 by phase modulation of the original signal S101 by using the modulation code sequence S104, and transmits the transmission signal S105 to the transmission antenna 105.

As a specific example, the phase modulation unit 104 converts the modulation code sequence S104 to a phase by taking a phase modulation amount as 0 when the bit indicates 0 and the phase modulation amount as $\pi$ when the bit indicates 1. In the following, description is made by assuming that the phase modulation unit 104 converts the modulation code sequence S104 to a phase as in this example.

Figure 4:
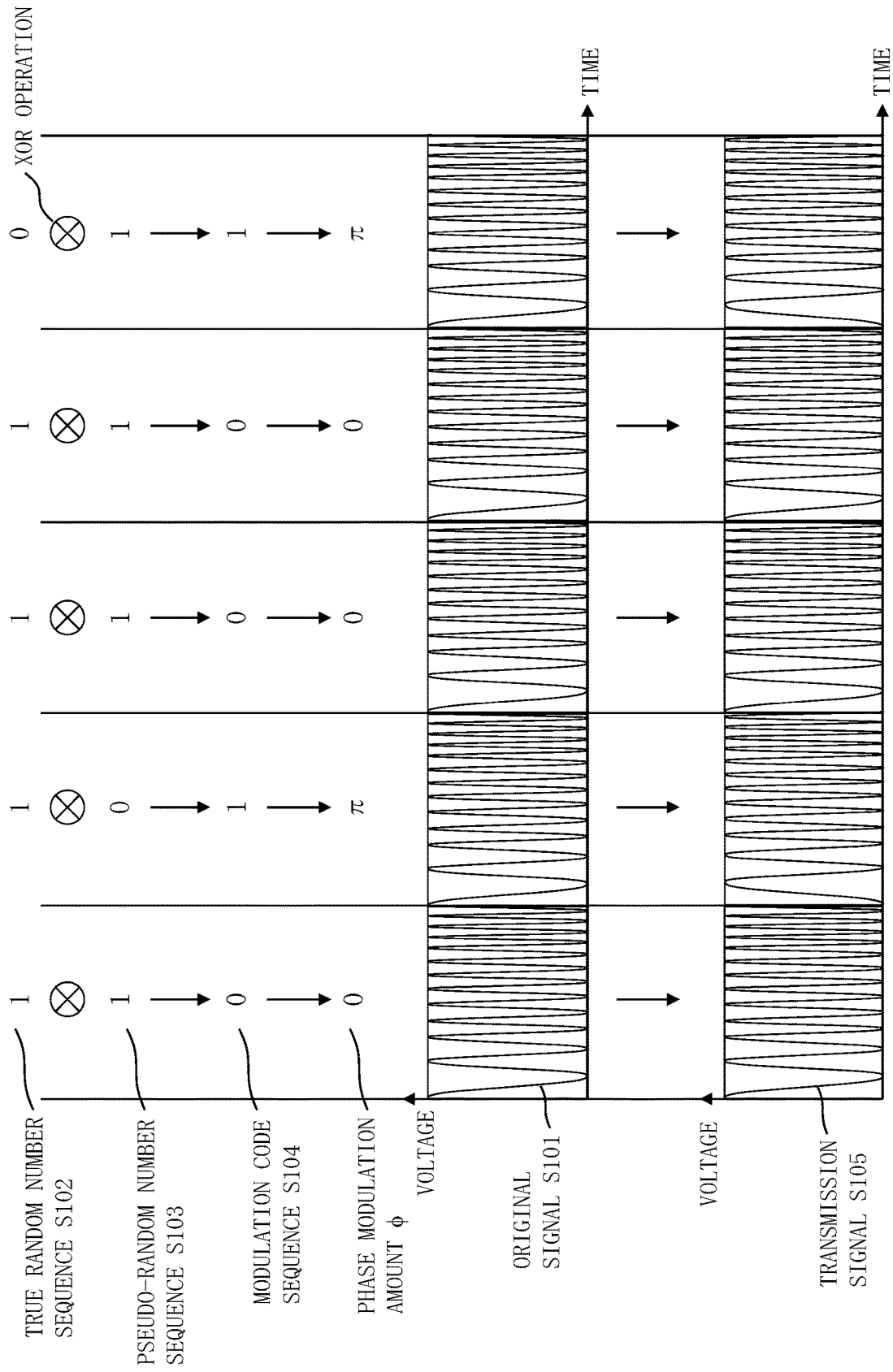
FIG. 4 is a diagram describing a flow in which a transmission signal S105 is generated according to Embodiment 1.

FIG. 4 illustrates an example of a flow in which the transmission signal S105 is generated.

The modulation code synthesizing unit 103 generates the modulation code sequence S104 by synthesizing the true random number sequence S102 and the pseudo-random number sequence S103 by using exclusive OR.

The phase modulation unit 104 generates the transmission signal S105 by performing phase modulation of the original signal S101 by using the modulation code sequence S104. The phase modulation unit 104 takes the phase modulation amount as 0 when the bit of the modulation code sequence S104 indicates 0, and takes the phase modulation amount as $\pi$ when the bit of the modulation code sequence S104 indicates 1.

The transmission antenna 105 transmits the transmission wave S106 to the outside world. The transmission wave S106 is reflected from the target 11.

The reception antenna 106 receives the reception wave S107. The reception antenna 106 converts the reception wave S107 to the reception signal S108, and transmits the reception signal S108 to the mixer unit 107.

The mixer unit 107 generates the mixer output signal S109 by performing mixing by using the reception signal S108 and the original signal S101, and transmits the mixer output signal S109 to the LPF unit 108. Mixing is multiplication of signals. Mixing is represented as expression (2).

$$\cos f_s t \cdot \cos f_r t = [\cos\{(f_s - f_r)t\} + \cos\{(f_s + f_r)t\}]/2 \quad (2)$$

$f_s$ represents the frequency of the original signal S101. $f_r$ represents the frequency of the reception signal S108. cos represents a cosine function. t represents time. $f_s$ and $f_r$ typically represent frequencies changed with time. As a specific example, $f_s$ and $f_r$ are frequencies corresponding chirp signals. In the following, $f_s$ and $f_r$ are assumed to be frequencies corresponding to chirp signals.

The LPF unit 108 extracts a low frequency wave of the mixer output signal S109. The LPF unit 108 regards a wave as being a low frequency wave when the frequency is $(f_s-f_r)$, and regards a wave as not being a low frequency wave when the frequency is $(f_s+f_r)$.

The beat signal S110 is a signal extracted by the LPF unit 108. The beat signal S110 can be represented as $\cos\{(f_s-f_r)t\}/2$ from expression (2). That is, the beat signal S110 is a signal having information about a frequency difference between the original signal S101 and the reception signal S108. The LPF unit 108 transmits the beat signal S110 to the ADC unit 109.

The ADC unit 109 generates the digital signal S111 by converting the beat signal S110 as an analog signal to a digital signal, and transmits the digital signal S111 to the demodulation unit 121.

The demodulation unit 121 demodulates the digital signal S111 by using the modulation code sequence S104, thereby generating a demodulation signal. The demodulation signal is transmitted to the target measurement unit 122.

The digital signal S111 includes information about the plurality of transmission waves S106 transmitted from the plurality of transmission antennas 105. The demodulation unit 121 demodulates the digital signal S111 by extracting, from the digital signal S111, the transmission wave S106 transmitted from one transmission antenna 105. In consideration of a phase shift by phase modulation being included in the beat signal S110, the digital signal S111 is represented as expression (3). Each term in expression (3) corresponds to one unit of chirp signals.

$$\Sigma(i=1 \text{ to } N)\cos\{f_{bi}t+\phi_i\} \quad (3)$$

$\phi_i$ represents an amount of phase modulation by the phase modulation unit 104-$i$. $f_{bi}$ represents the frequency of the beat signal S110 corresponding to the transmission antenna 105-$i$. N represents a total number of transmission antennas 105.

For example, as in FIG. 1, it is assumed that two transmission antennas 105 are present. Here, when the demodulation unit 121 performs demodulation by using the modulation code sequence S104-1, the demodulated signal is represented as expression (4).

$$\cos\{f_{b1}t+2\phi_1\}+\cos\{f_{b2}t+\phi_1+\phi_2\}=\cos\{f_{b1}t\}+\cos\{f_{b2}t+\phi_1+\phi_2\} \quad (4)$$

Here, $\phi_i=\{0, \pi\}$ holds. Therefore, $\cos\{2\phi_1\}=1$ and $\sin\{2\phi_1\}=0$ hold. Thus, $\cos\{f_{b1}t+2\phi_1\}=\cos\{f_{b1}t\}$ holds.

Modulation and demodulation correspond to phase rotation. When the phase is rotated by $2\pi$, the phase is rotated once. That is, rotating the phase by $2\pi$ is identical to not rotating the phase. Therefore, demodulation is equivalent to performing XOR operation on a bit string when $\phi_i=\{0, \pi\}$. Therefore, the $\phi_1+\phi_2$ components in $\cos\{f_{b2}t+\phi_1+\phi_2\}$ of expression (4) can be thought to correspond to the result obtained by performing XOR operation on one element of the modulation code sequence S104-1 and one element of the modulation code sequence S104-2. Therefore, while both $\phi_1$ and $\phi_2$ are each generated based on the true random number sequence S102, when the demodulation unit 121 demodulates the digital signal S111, the components of the true random number sequence S102 included in the digital signal S111 are mutually canceled out. Thus, it can also be thought that $\phi_1$ and $\phi_2$ are each generated based on the pseudo-random number sequence S103. That is, when the pseudo-random number generation unit 102 generates a sequence with high autocorrelation as the pseudo-random number sequence S103, the results obtained by the demodulation unit 121 integrating a signal as appropriate in a range of one cycle unit (which is referred to as one sweep unit in FMCW radars) of the pseudo-random number sequence S103 are such that $\cos\{f_{b1}t\}$ components are mutually reinforced and $\cos\{f_{b2}t+\phi_1+\phi_2\}$ components are mutually weakened. The sequence with high autocorrelation is, as a specific example, an M sequence or Gold sequence.

By using the property in which the $\cos\{f_{b1}t\}$ components are mutually reinforced, the demodulation unit 121 can take out the $\cos\{f_{b1}t\}$ components.

Figure 5:
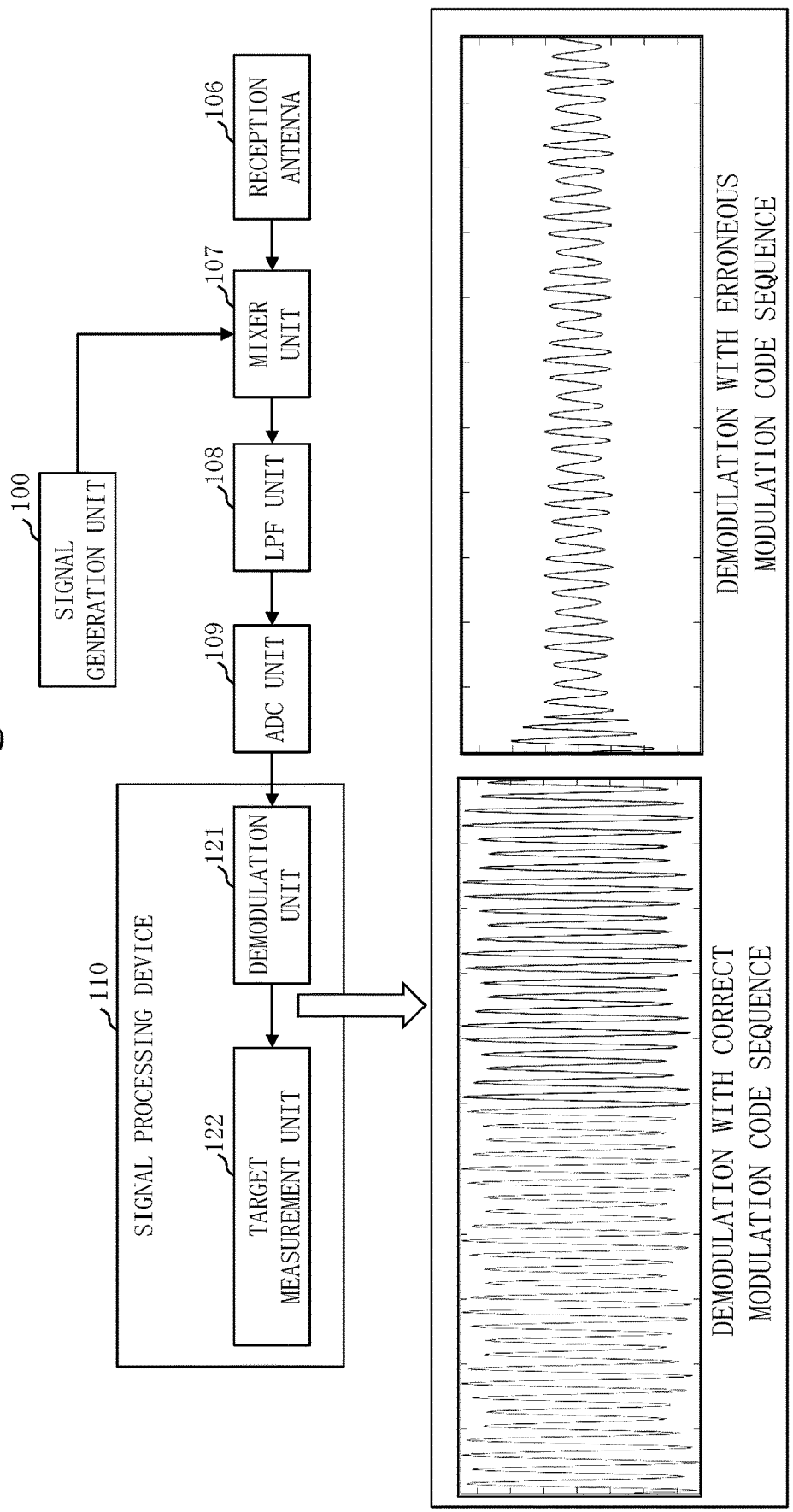
FIG. 5 is a diagram describing the operation of a demodulation unit 121 according to Embodiment 1.

FIG. 5 is a diagram describing an example of operation of the demodulation unit 121.

Consider that the demodulation unit 121 takes a total sum of signals demodulated by one cycle unit of the pseudo-random number sequence S103. The $\cos\{f_{b1}t\}$ components correspond to a signal obtained by demodulation by using a correct modulation code sequence. The correct modulation code sequence is the modulation code sequence S104 used by the phase modulation unit 104 when the transmission signal S105 corresponding to the digital signal S111 is generated. The $\cos\{f_{b2}t+\phi_1+\phi_2\}$ components correspond to a signal obtained by demodulation by using an erroneous modulation code sequence. When the demodulation unit 121 performs demodulation by using the erroneous modulation code sequence, signal phases are often not identical. Thus, the demodulation unit 121 cannot obtain the result with signals piled up, but obtains the result with signals mutually weakened.

Based on the demodulation signal, the target measurement unit 122 calculates a distance from the radar device 10 to the target 11, a speed of the target 11, and an angle formed by the radar device 10 and the target 11.

Note that as the above description, the true random number sequence S102 is canceled out in the demodulation signal. Thus, modulation by using the true random number sequence S102 does not affect measurement of a distance, speed, and angle by the target measurement unit 122.

\*\*\*Description of Effects of Embodiment 1\*\*\*

As described above, the radar device 10 according to the present embodiment adopts the MIMO scheme and the FMCW scheme and devises a signal sequence for use in modulation, thereby achieving the following effects.

The modulation code synthesizing unit 103 generates the modulation code sequence S104 based on the true random number sequence S102 and the pseudo-random number sequence S103. The phase modulation unit 104 generates the transmission signal S105 by modulating the phase of the original signal S101 by using the modulation code sequence S104. The pseudo-random number sequences S103 for use by the respective phase modulation units 104 are generated by the pseudo-random number generation units 102 different from each other. Thus, the respective phase modulation units 104 normally generate the transmission signals S105 different from each other. Thus, the transmission waves S106 transmitted from the respective transmission antennas 105 are normally different from each other. Thus, the radar device 10 can normally prevent the plurality of transmission waves S106 from interfering with each other.

The demodulation unit 121 performs demodulation by using the modulation code sequence S104. Here, the components based on the true random number sequence S102 are canceled out. Thus, modulation by using the true random number sequence S102 does not affect measurement of a position, speed, or the like of the target 11 by the target measurement unit 122.

Even if having grasped the pseudo-random number sequence S103 by observing the transmission waves S106, an attacker cannot guess the true random number sequence S102. Therefore, the attacker cannot guess the modulation code sequence S104. Thus, according to the radar device 10 of the present embodiment, the risk of undergoing a deception attack can be reduced.

\*\*\*Other Structures\*\*\*

Modification Example 1

The radar device 10 may include at least one of the transmission antenna 105 and the reception antenna 106. In the case of one transmission antenna 105, the number of pseudo-random number generation units 102, the number of modulation code synthesizing units 103, and the number of phase modulation units 104 may be one each. In the case of one reception antenna 106, the number of mixer units 107, the number of LPF units 108, and the number of ADC units 109 may be one each.

That is, the radar device 10 may include at least one each component described as being plural included in the present embodiment.

Modification Example 2

In the following, points different from the above-described embodiment are described with reference to the drawings.

Figure 6:
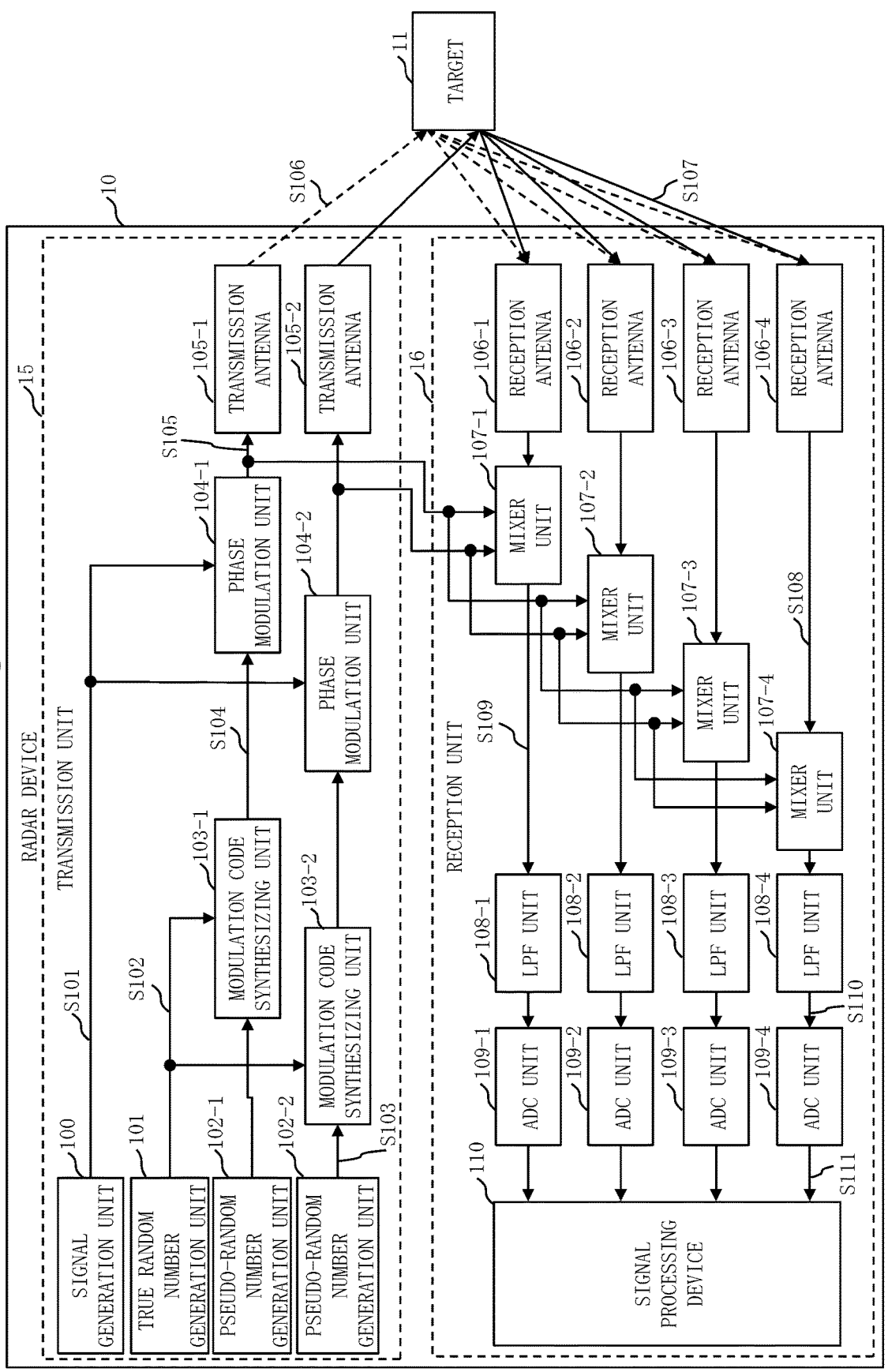
FIG. 6 illustrates an example of structure of the radar device 10 according to a modification example of Embodiment 1.

FIG. 6 illustrates an example of structure of the radar device 10 according to the present modification example. With reference to this drawing, differences between the radar device 10 according to the present embodiment and the radar device 10 according to the present modification example are described.

Note that the mixer unit 107 may correspond to each phase modulation unit 104. That is, the number of mixer units 107 may be a number obtained by multiplying the number of phase modulation units 104 by the number of reception antennas 106.

Figure 7:
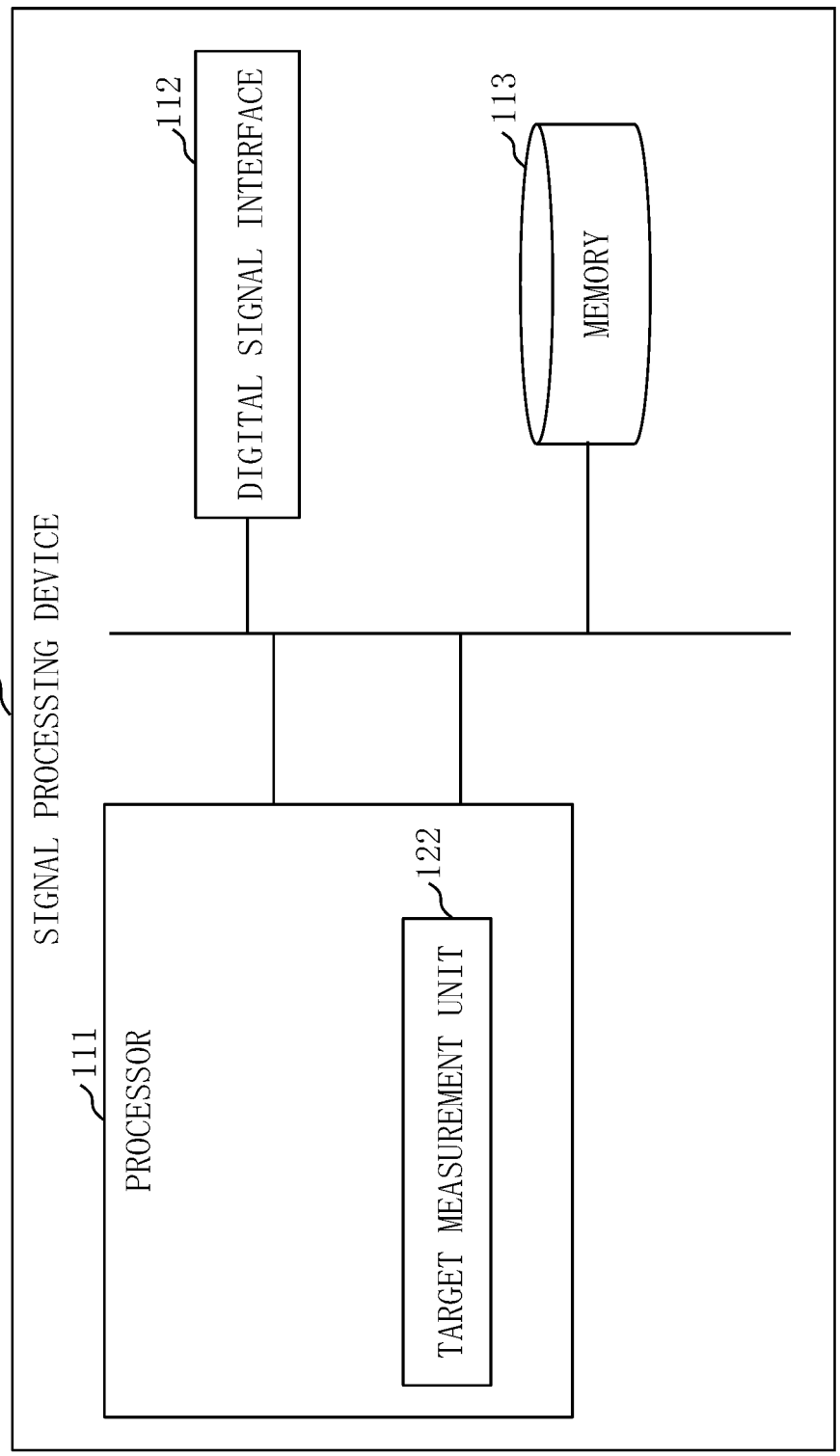
FIG. 7 illustrates an example of structure of the signal processing device 110 according to the modification example of Embodiment 1.

FIG. 7 illustrates an example of structure of the signal processing device 110 according to the present modification example. The signal processing device 110 does not include the demodulation unit 121.

Figure 8:
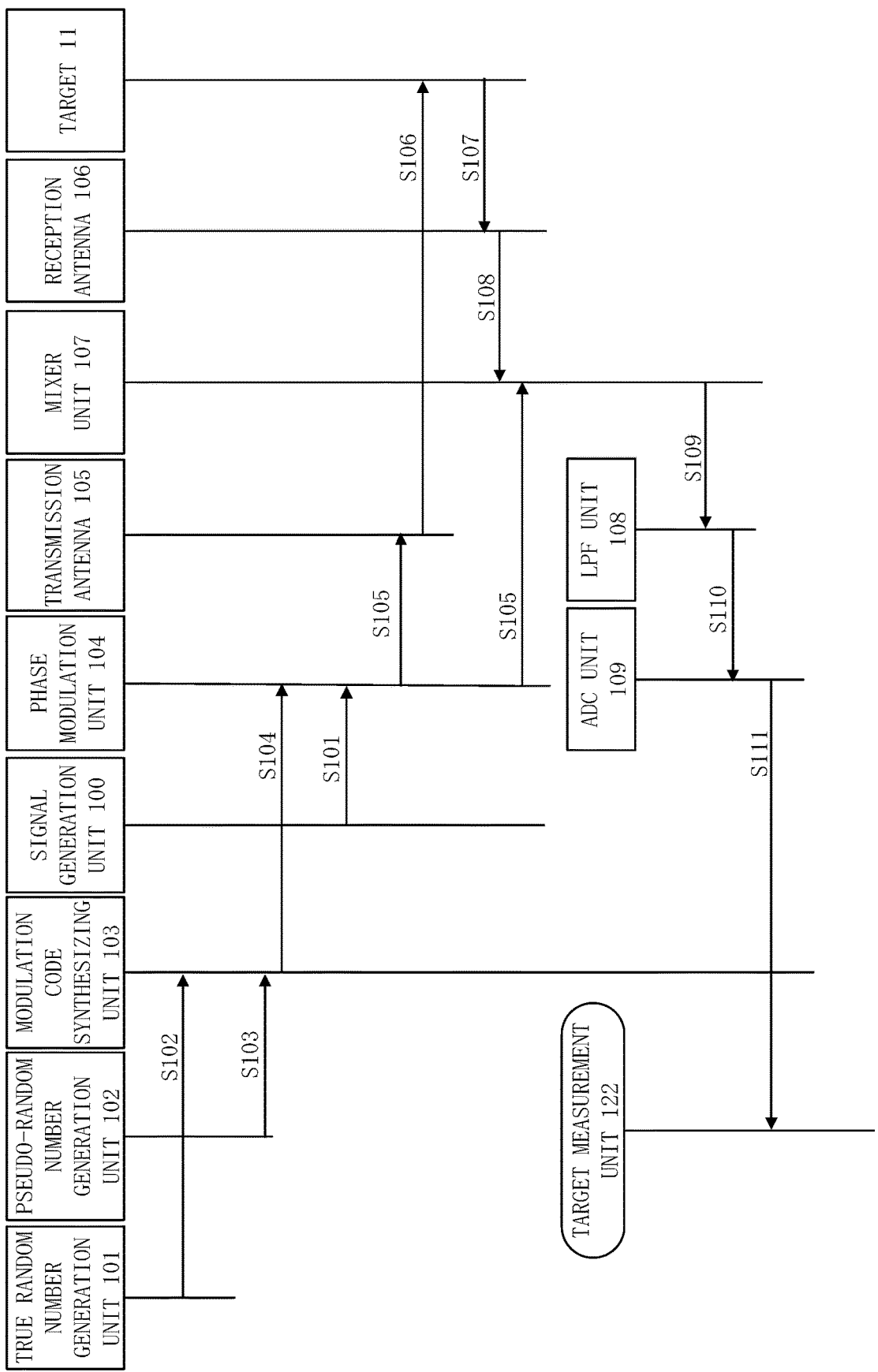
FIG. 8 is a sequence diagram illustrating the operation of the radar device 10 according to the modification example of Embodiment 1.

FIG. 8 is a sequence diagram illustrating one example of operation of the radar device 10 according to the present modification example. With reference to this drawing, differences between the operation of the radar device 10 according to the present embodiment and the operation of the radar device 10 according to the present modification example are described.

The signal generation unit 100 does not transmit the original signal S101 to the mixer unit 107.

The modulation code synthesizing unit 103 does not transmit the modulation code sequence S104 to the signal processing device 110.

The phase modulation unit 104 transmits the transmission signal S105 also to the mixer unit 107.

The mixer unit 107 receives the transmission signal S105 instead of the original signal S101 and, by mixing the transmission signal S105 and the reception signal S108, generates a mixer output signal S109. The mixer output signal S109 is a signal obtained by demodulating the reception signal S108.

When the mixer unit 107 receives a plurality of transmission signals S105, the mixer unit 107 mixes each transmission signal S105 and the reception signal S108. In this case, the number of mixer output signals S109 generated by the mixer unit 107 matches the number of transmission signals S105 received by the mixer unit 107. Then, the LPF unit 108 generates the beat signal S110 corresponding to each mixer output signal S109, and the ADC unit 109 generates the digital signal S111 corresponding to each beat signal S110.

Also in this case, the radar device 10 may include one mixer unit 107 for one reception antenna 106 or may include a plurality of mixer units 107 for one reception antenna 106. When the radar device 10 includes one mixer unit 107 for one reception antenna 106, as a specific example, the mixer unit 107 switches the transmission signal S105 for use in mixing at predetermined time intervals. When the radar device 10 includes a plurality of mixer units 107 for one reception antenna 106, as a specific example, the number of transmission signals S105 and the number of mixer units 107 are equal, and each mixer unit 107 corresponds to each different transmission signal S105.

The signal processing device 110 does not receive the modulation code sequence S104.

The target measurement unit 122 uses the digital signal S111 instead of a demodulation signal.

As described above, according to the present modification example, the mixer unit 107 performs demodulation using the transmission signal S105. Thus, the mixer unit 107 performs mixing and demodulation at the same time. Therefore, the signal processing device 110 is not required to include the demodulation unit 121. Therefore, the radar device 10 is not required to retain the modulation code sequence S104. Also, the signal processing device 110 according to the present modification example may be one for use in a normal radar device.

Modification Example 3

Figure 9:
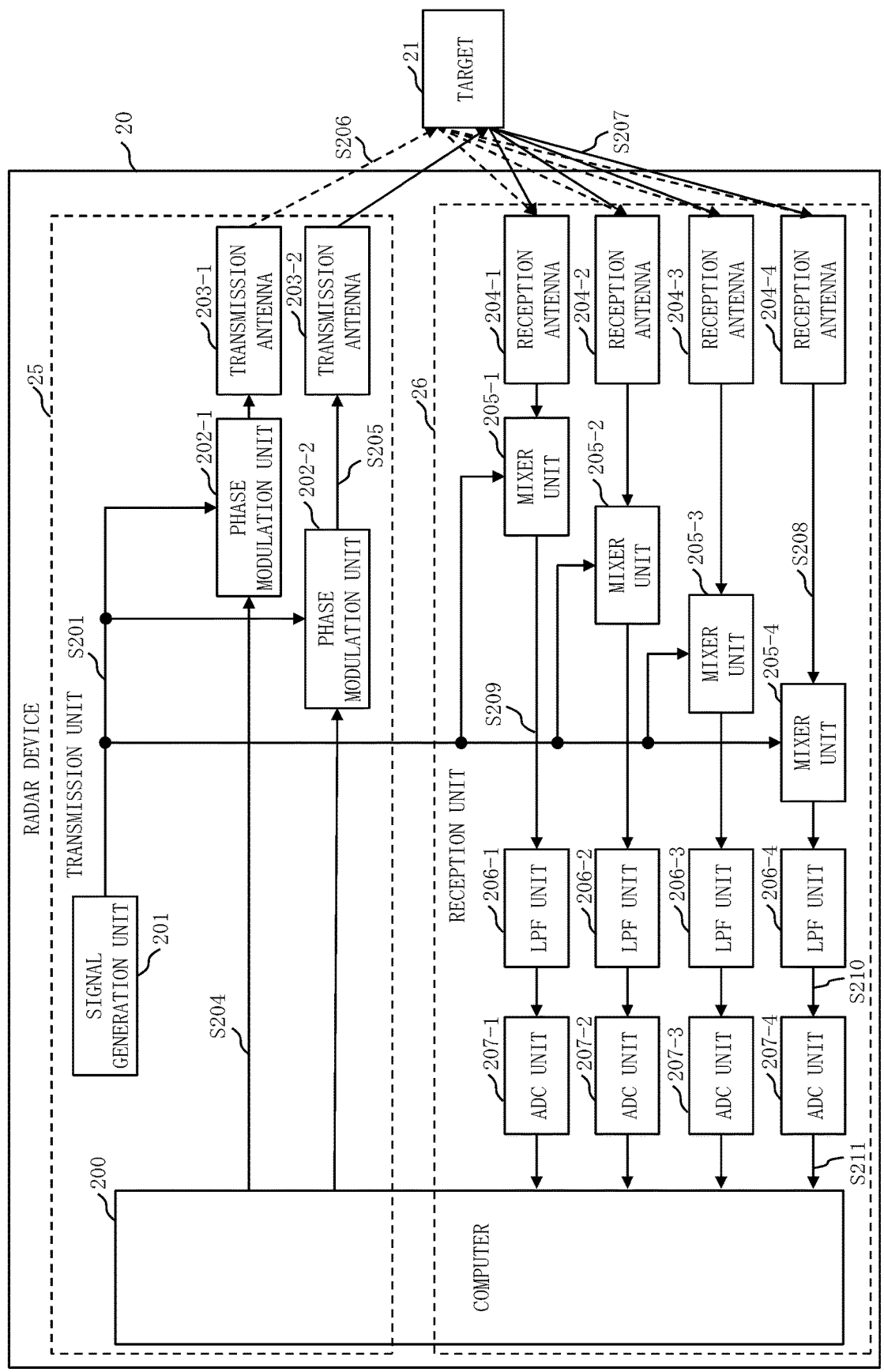
FIG. 9 illustrates an example of structure of a radar device 20 according to a modification example of Embodiment 1.

FIG. 9 illustrates an example of structure of a radar device 20. The radar device 20 is a device which has another structure of the radar device 10 and implements part of the functions of the radar device 10 by using a computer.

The radar device 20 is configured of a transmission unit 25 and a reception unit 26. The transmission unit 25 and the reception unit 26 share and use a computer 200.

The transmission unit 25 is formed of a signal generation unit 201, a plurality of phase modulation units 202, and a plurality of transmission antennas 203.

The signal generation unit 201 is equivalent to the signal generation unit 100. The phase modulation unit 202 is equivalent to the phase modulation unit 104. The transmission antenna 203 is equivalent to the transmission antenna 105.

The number of phase modulation units 202 matches the number of transmission antennas 203.

The reception unit 26 is formed of a plurality of reception antennas 204, a plurality of mixer units 205, a plurality of LPF units 206, and a plurality of ADC units 207.

The reception antenna 204 is equivalent to the reception antenna 106. The mixer unit 205 is equivalent to the mixer unit 107. The LPF unit 206 is equivalent to the LPF unit 108. The ADC unit 207 is equivalent to the ADC unit 109. The number of mixer units 205, the number of LPF units 206, and the number of ADC units 207 each match the number of reception antennas 204.

An original signal S201 is similar to the original signal S101. A modulation code sequence S204 is a sequence formed of signals generated by the computer 200. The modulation code sequence S204 may be an analog signal sequence. A transmission signal S205 is similar to the transmission signal S105.

A transmission wave S206 is similar to the transmission wave S106. A reception wave S207 is similar to the reception wave S107.

A reception signal S208 is similar to the reception signal S108. A mixer output signal S209 is similar to the mixer output signal S109. A beat signal S210 is similar to the beat signal S110. A digital signal S211 is similar to the digital signal S111.

Figure 10:
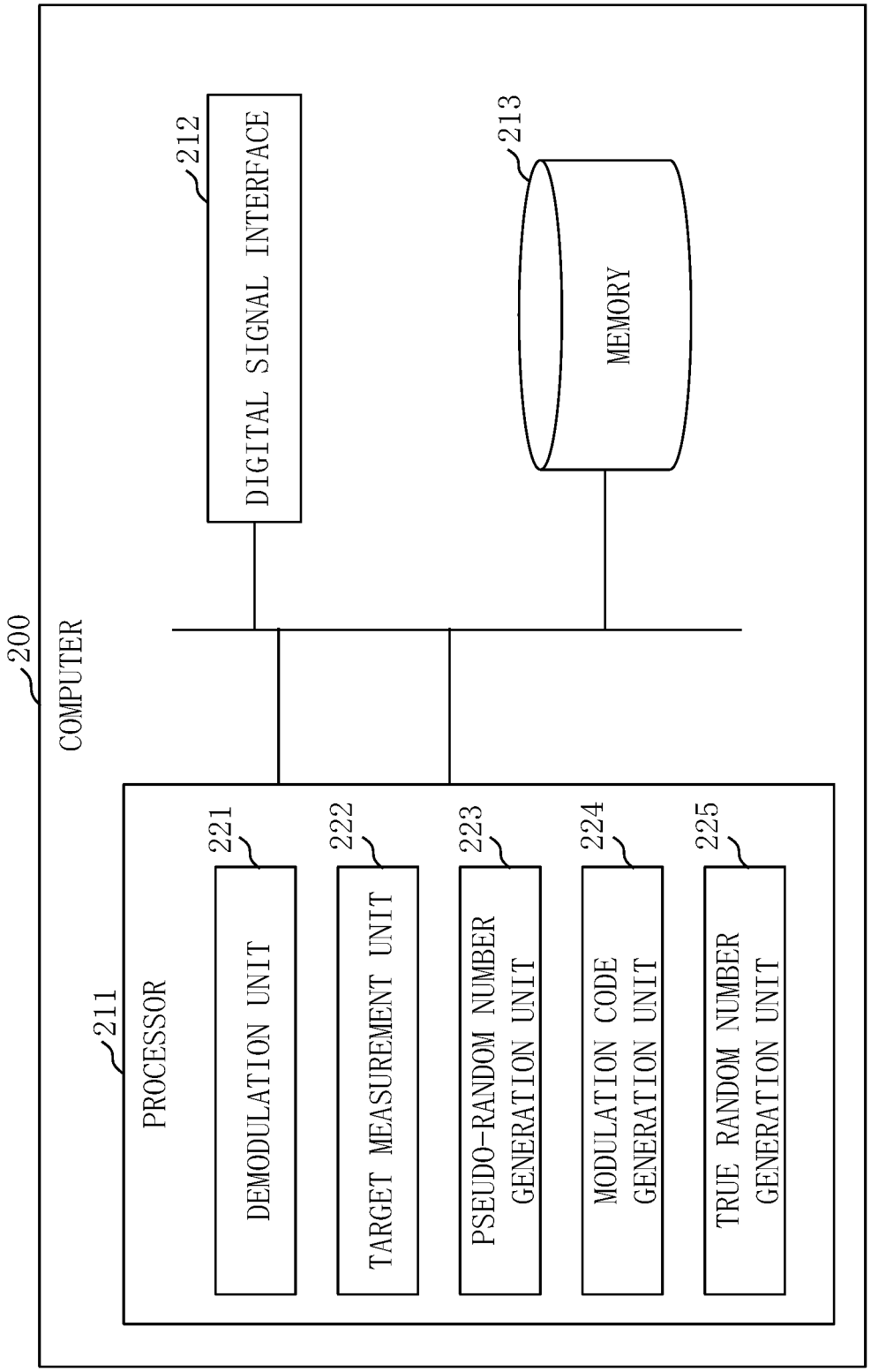
FIG. 10 illustrates an example of hardware structure of a computer 200 according to the modification example of Embodiment 1.

FIG. 10 illustrates an example of hardware structure of the computer 200. The computer 200 is a general computer.

The computer 200 includes a processor 211, a digital signal interface 212, and a memory 213 as hardware.

The computer 200 includes a demodulation unit 221, a target measurement unit 222, a pseudo-random number generation unit 223, a modulation code generation unit 224, and a true random number generation unit 225 as functional components.

The processor 211 is equivalent to the processor 111. The digital signal interface 212 is equivalent to the digital signal interface 112. The digital signal interface 212 is used to connect the phase modulation units 202 and the ADC units 207 and the computer 200 together. The memory 213 is equivalent to the memory 113.

The demodulation unit 221, the target measurement unit 222, the pseudo-random number generation unit 223, the modulation code generation unit 224, and the true random number generation unit 225 are implemented by a program. The program is stored in the memory 213 and is executed in the processor 211.

The operation of the radar device 20 is described.

The operation of the radar device 20 is similar to the operation of the radar device 10. The operation of the radar device 20 is similar to the operation in the sequence diagram of FIG. 3, with the true random number generation unit 101 being read as the true random number generation unit 225, the pseudo-random number generation unit 102 as the pseudo-random number generation unit 223, the modulation code synthesizing unit 103 as the modulation code generation unit 224, the signal generation unit 100 as the signal generation unit 201, the phase modulation units 104 as the phase modulation units 202, the transmission antennas 105 as the transmission antennas 203, the mixer units 107 as the mixer units 205, the reception antennas 106 as the reception antennas 204, the target 11 as a target 21, the LPF units 108 as the LPF units 206, the ADC units 109 as the ADC units 207, the demodulation unit 121 as the demodulation unit 221, and the target measurement unit 122 as the target measurement unit 222.

The true random number generation unit 225 may generate a true random number sequence by using the digital signal S211 of the ADC unit 207.

Figure 11:
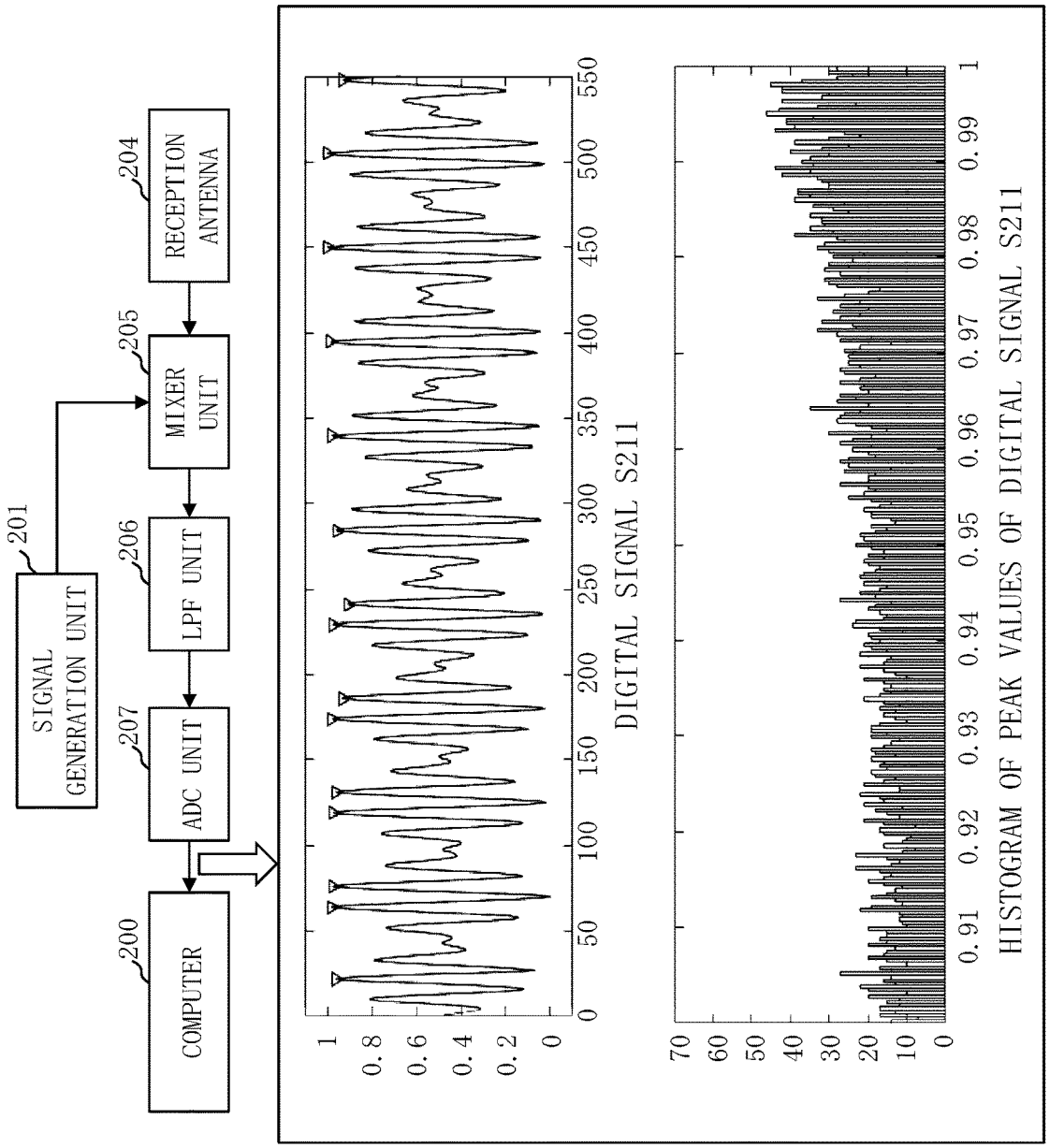
FIG. 11 is a diagram describing an example of a process in which a true random number generation unit 225 generates a random number according to the modification example of Embodiment 1.

FIG. 11 is a diagram describing an example of a process in which the true random number generation unit 225 generates a true random number sequence from the digital signal S211. The digital signal S211 indicated in a middle part of this drawing is obtained by digitalizing the beat signal S210, and is a signal formed of a sine wave (hereinafter, a sinewave signal).

Consider that, as a specific example, the true random number generation unit 225 generates a random number from the digital signal S211 by using a peak of the sinewave signal for the random number.

In a graph of the digital signal S211 of FIG. 11, a sign V is indicated for a peak of the sinewave. A histogram generated by collecting peaks of the sinewave for one sweep is as illustrated in a lower part of FIG. 11. In this histogram, it can be observed that values sufficiently vary, and no significant bias is observed in the values. Thus, the true random number generation unit 225 can utilize the peak values of the sinewave as in this example for generating a random number.

Figure 12:
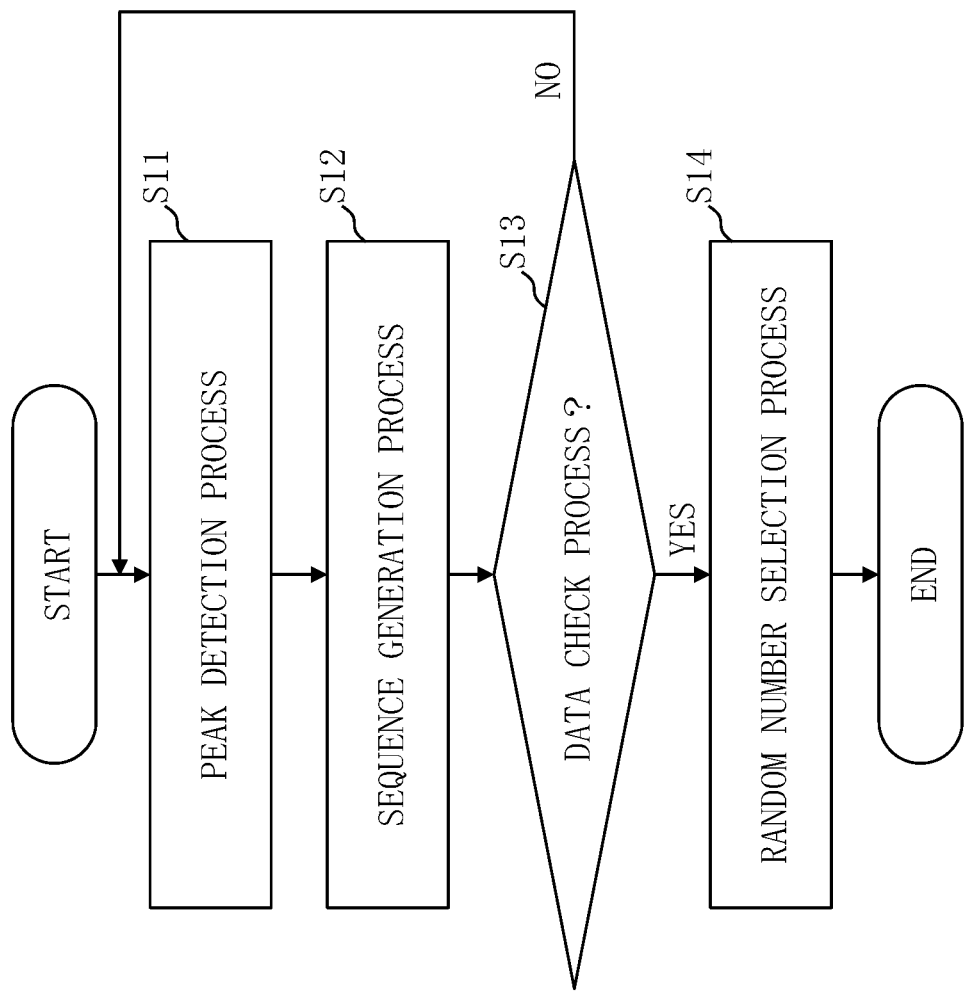
FIG. 12 is a flowchart illustrating the operation of the true random number generation unit 225 according to the modification example of Embodiment 1.

FIG. 12 illustrates a flowchart illustrating one example of a procedure in which the true random number generation unit 225 generates a random number of one bit from the digital signal S211.

(Step S11: Peak Detection Process)

The true random number generation unit 225 detects a peak from the digital signal S211.

As a specific example, when a plurality of peaks are observed in the digital signal S211 as in FIG. 11, the true random number generation unit 225 takes a maximum value of the plurality of peaks, a minimum value of the plurality of peaks, an average value of the plurality of peaks, or a median of the plurality of peaks as a peak. An extreme value is a general term of a maximal value, a minimal value, a maximum value, and a minimum value of the digital signal S211.

(Step S12: Sequence Generation Process)

The true random number generation unit 225 generates a one-bit sequence by using the value of the detected peak. The one-bit sequence is a sequence formed of signals of one bit.

As a specific example, the true random number generation unit 225 uses a method of allocating 0 or 1 in accordance with whether the peak value has an even number or not, a method of generating a one-bit random number by taking the value of the peak as a seed of a pseudo-random function, or a method of generating a hash value corresponding to the value of the peak by using a hash function and adopting a certain bit value of the generated hash value.

(Step S13: Data Check Process)

When the true random number generation unit 225 ends the process on all digital signals S211 corresponding to all reception antennas 204, the true random number generation unit 225 returns to step S11. Otherwise, the true random number generation unit 225 proceeds to step S14.

(Step S14: Random Number Selection Process)

The true random number generation unit 225 selects a random number of one bit from the one-bit sequence generated at step S12.

As a specific example, the true random number generation unit 225 uses a method of cyclically referring to the digital signal S211-$i$ ($i$=1, 2, 3, . . . , 1, 2, . . . ) or a method of adopting the result of XOR operation on all random numbers.

As described above, the true random number generation unit 225 can generate a random number of one bit from signals of one chirp.

The effects of the radar device 20 are equivalent to the effects of the radar device 10.

Modification Example 4

In the present embodiment, the case has been described in which each functional component of the signal processing device 110 is implemented by software. However, as a modification example, each functional component may be implemented by hardware.

Figure 13:
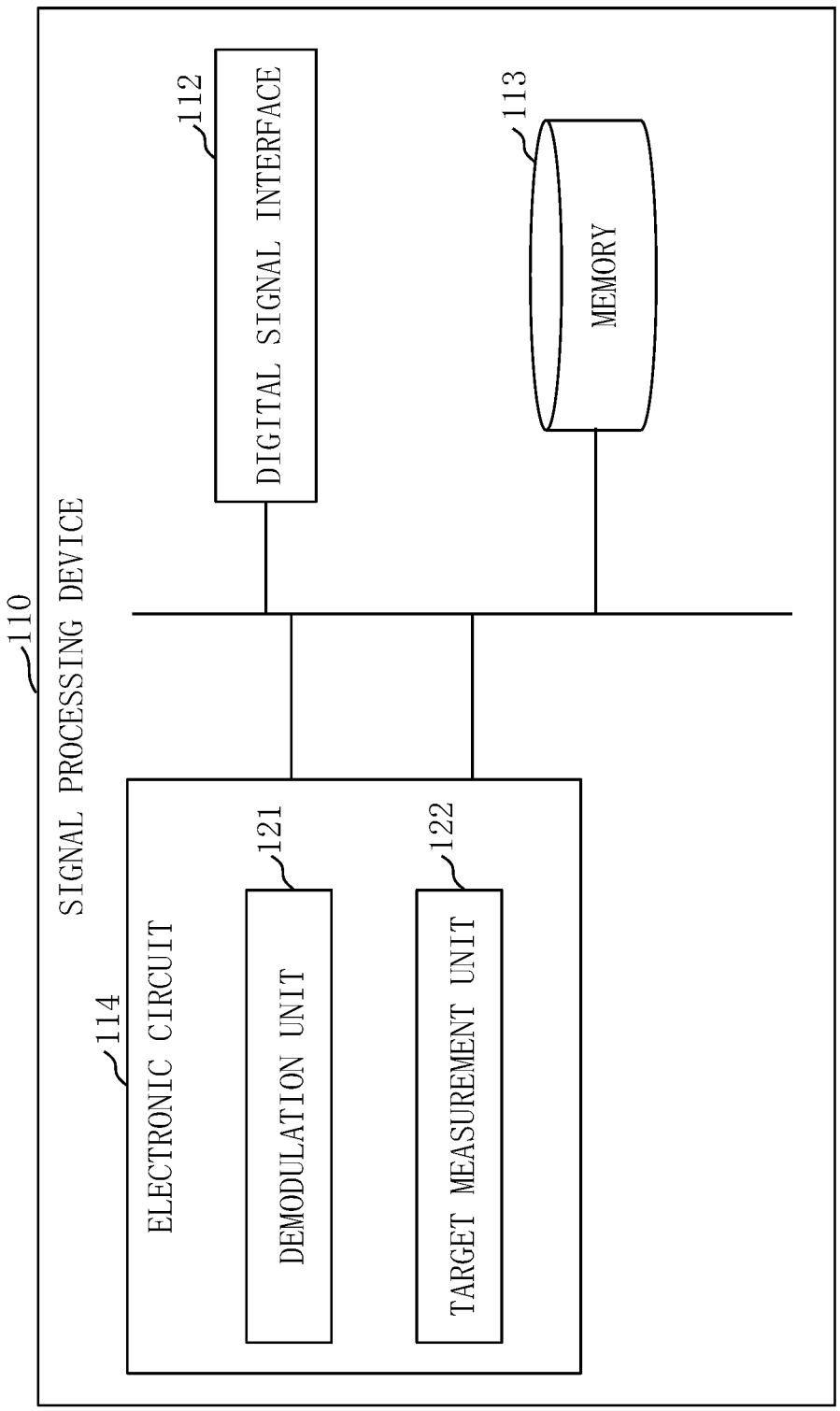
FIG. 13 illustrates an example of structure of the signal processing device 110 according to a modification example of Embodiment 1.

FIG. 13 illustrates an example of hardware structure of the signal processing device 110 according to the present modification example.

When each functional component is implemented by hardware, as illustrated in this drawing, the signal processing device 110 includes an electronic circuit 114 in place of the processor 111. Alternatively, although not depicted, the signal processing device 110 includes an electronic circuit 114 in place of the processor 111 and the memory 113. The electronic circuit 114 is a dedicated electronic circuit achieving the function of each functional component (and the memory 113). The electronic circuit may be referred to as a processing circuit.

As the electronic circuit 114, a single circuit, composite circuit, programmed processor, parallel-programmed processor, logic IC, GA (Gate Array), ASIC (Application Specific Integrated Circuit), or FPGA (Field-Programmable Gate Array) is assumed.

Each functional component may be implemented by a single electronic circuit 114 or each functional component may be implemented as being distributed to a plurality of electronic circuits 114. Alternatively, part of each functional component may be implemented by hardware and the remaining each functional component may be implemented by software.

The processor 111, the memory 113, and the electronic circuit 114 described above are collectively referred to as "processing circuitry". That is, the function of each functional component of the signal processing device 110 is implemented by processing circuitry.

As with the signal processing device 110, the computer 200 may include an electronic circuit in place of the processor 211 or in place of the processor 211 and the memory 213.

Embodiment 2

In the following, points different from the above-described embodiment are described with reference to the drawings.

A radar device 30 according to the present embodiment is a radar device which adopts the fast FMCW scheme and also adopts the MIMO scheme. The radar device 30 includes a piece of hardware having a function of transmitting signals and a piece of hardware having a function of receiving signals. Both of the pieces of hardware differ from each other.

*Description of Structure*

Figure 14:
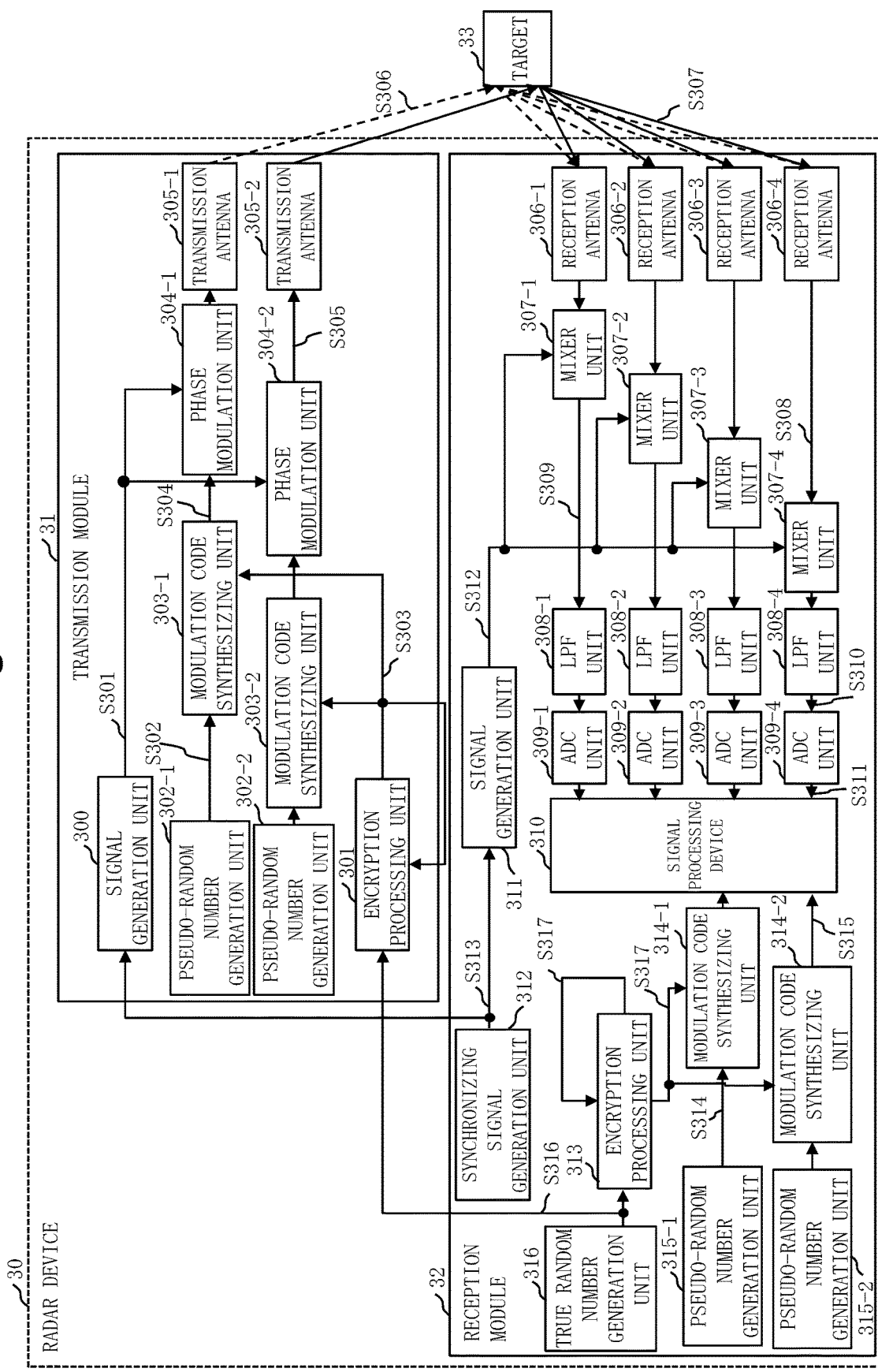
FIG. 14 illustrates an example of structure of a radar device 30 according to Embodiment 2.

FIG. 14 illustrates an example of structure of the radar device 30.

As illustrated in this drawing, the radar device 30 includes a transmission module 31 and a reception module 32.

The transmission module 31 includes a signal generation unit 300, an encryption processing unit 301, a plurality of pseudo-random number generation units 302, a plurality of modulation code synthesizing units 303, a plurality of phase modulation units 304, and a plurality of transmission antennas 305. The signal generation unit 300 is equivalent to the signal generation unit 100.

The encryption processing unit 301 is typically comprised of a circuit. The pseudo-random number generation unit 302 is equivalent to the pseudo-random number generation unit 102. The modulation code synthesizing unit 303 is equivalent to the modulation code synthesizing unit 103. The phase modulation unit 304 is equivalent to the phase modulation unit 104. The transmission antenna 305 is equivalent to the transmission antenna 105.

The number of pseudo-random number generation units 302, the number of modulation code synthesizing units 303, and the number of phase modulation units 304 each match the number of transmission antennas 305.

The signal generation unit 300 is also referred to as a transmission-side signal generation unit. An original signal S301 is also referred to as a transmission-side original signal. The signal generation unit 300 generates a signal as the original signal S301.

The signal generation unit 300 synchronizes the original signal S301 with an original signal S312 by using a synchronizing signal S313. As a specific example, at a certain point in time, the signal generation unit 300 makes the original signal S301 identical to the original signal S312.

The encryption processing unit 301 is also referred to as a transmission-side encryption processing unit. An encryption sequence S303 is also referred to as a transmission-side encryption sequence. The encryption processing unit 301 receives a true random number sequence S316, and generates the encryption sequence S303, which is a signal sequence of encryption, by using the true random number sequence S316. The true random number sequence S316 is formed of true random numbers of one bit or more. The sequence for encryption is a sequence relating to an encryption algorithm. The sequence for encryption may be a sequence obtained by encrypting plaintext.

The pseudo-random number generation unit 302 is also referred to as a transmission-side pseudo-random number generation unit. A pseudo-random number sequence S302 is also referred to as a transmission-side pseudo-random number sequence. The pseudo-random number generation unit 302 generates the pseudo-random number sequence S302 formed of pseudo-random numbers of one bit or more.

The modulation code synthesizing unit 303 is also referred to as a transmission-side modulation code synthesizing unit. A modulation code sequence S304 is also referred to as a transmission-side modulation code sequence. The modulation code synthesizing unit 303 generates the modulation code sequence S304 by synthesizing the pseudo-random number sequence S302 and the encryption sequence S303. The modulation code sequence S304 is similar to the modulation code sequence S104. However, in place of the components derived from the true random number sequence S102, the modulation code sequence S304 includes components derived from the encryption sequence S303.

The phase modulation unit 304 generates a transmission signal S305 by modulating the phase of the original signal S301 by using the modulation code sequence S304.

The signal generation unit 300 and the encryption processing unit 301 each include a communication IF (Interface) for communication with the reception module 32. The communication IF is, as a specific example, a Wi-Fi (registered trademark) module or Ethernet (registered trademark) module.

The reception module 32 includes a plurality of reception antennas 306, a plurality of mixer units 307, a plurality of LPF units 308, a plurality of ADC units 309, a signal processing device 310, a signal generation unit 311, a synchronizing signal generation unit 312, an encryption processing unit 313, a plurality of modulation code synthesizing units 314, a plurality of pseudo-random number generation units 315, and a true random number generation unit 316.

The reception antenna 306 is equivalent to the reception antenna 106. The mixer unit 307 is equivalent to the mixer unit 107. The LPF unit 308 is equivalent to the LPF unit 108. The ADC unit 309 is equivalent to the ADC unit 109. The signal processing device 310 is equivalent to the signal processing device 110. The signal generation unit 311 is equivalent to the signal generation unit 100. The synchronizing signal generation unit 312 is typically comprised of a circuit. The encryption processing unit 313 is equivalent to the encryption processing unit 301. The modulation code synthesizing unit 314 is equivalent to the modulation code synthesizing unit 103. The pseudo-random number generation unit 315 is equivalent to the pseudo-random number generation unit 102. The true random number generation unit 316 is equivalent to the true random number generation unit 101. The number of mixer units 307, the number of LPF units 308, and the number of ADC units 309 each match the number of reception antennas 306.

The number of modulation code synthesizing units 314 and the number of pseudo-random number generation units 315 each match the number of transmission antennas 305.

The mixer unit 307 receives a signal as a reception signal S308, and generates a mixer output signal S309 by mixing the original signal S312 and the reception signal S308.

The LPF unit 308 generates a beat signal S310 by extracting a low frequency wave of the mixer output signal S309.

The signal generation unit 311 is also referred to as a reception-side signal generation unit. The original signal S312 is also referred to as a reception-side original signal. The signal generation unit 311 generates a signal corresponding to the original signal S301 as the original signal S312.

The signal generation unit 311 synchronizes the original signal S312 with an original signal S301 by using a synchronizing signal S313.

The synchronizing signal generation unit 312 generates a synchronizing signal S313 for use in signal synchronization, and transmits the synchronizing signal S313 to the transmission module 31.

The encryption processing unit 313 is also referred to as a reception-side encryption processing unit. An encryption sequence S317 is also referred to as a reception-side encryption sequence. The encryption processing unit 313 receives a true random number sequence S316, and generates the encryption sequence S317, which is a signal sequence of encryption, by using the true random number sequence S316.

The modulation code synthesizing unit 314 is also referred to as a reception-side modulation code synthesizing unit. A modulation code sequence S315 is also referred to as a reception-side modulation code sequence. The modulation code synthesizing unit 314 generates the modulation code sequence S315 by synthesizing a pseudo-random number sequence S314 and the encryption sequence S317. The modulation code sequence S315 is similar to the modulation code sequence S304.

The pseudo-random number generation unit 315 is also referred to as a reception-side pseudo-random number generation unit. The pseudo-random number sequence S314 is also referred to as a reception-side pseudo-random number sequence.

The true random number generation unit 316 generates a true random number sequence S316, and transmits the true random number sequence S316 to the transmission module 31.

The synchronizing signal generation unit 312 and the true random number generation unit 316 each include a communication IF for communication with the transmission module 31.

The original signal S301 is similar to the original signal S101. The pseudo-random number sequence S302 is similar to the pseudo-random number sequence S103.

The encryption sequence S303 is a sequence formed of signals generated by the encryption processing unit 301. The modulation code sequence S304 is a sequence formed of signals generated by the modulation code synthesizing unit 303. The transmission signal S305 is a sequence formed of signals generated by the phase modulation unit 304. A transmission wave S306 is similar to the transmission wave S106.

A reception wave S307 is similar to the reception wave S107. The reception signal S308 is similar to the reception signal S108. The mixer output signal S309 is similar to the mixer output signal S109. The beat signal S310 is similar to the beat signal S110. A digital signal S311 is similar to the digital signal S111. The original signal S312 is a signal generated by the signal generation unit 311. The synchronizing signal S313 is a signal generated by the synchronizing signal generation unit 312. The synchronizing signal S313 is used to synchronize the transmission module 31 and the reception module 32. The pseudo-random number sequence S314 is a sequence formed of signals generated by the pseudo-random number generation unit 315. The modulation code sequence S315 is a sequence formed of signals generated by the modulation code synthesizing unit 314. The true random number sequence S316 is a sequence formed of signals generated by the true random number generation unit 316. The encryption sequence S317 is a sequence formed of signals generated by the encryption processing unit 313.

A difference between the radar device 10 and the radar device 30 is that the transmission module 31 and the reception module 32 are different pieces of hardware each other. Thus, the transmission module 31 and the reception module 32 each include elements corresponding to the signal generation unit 100, the pseudo-random number generation units 102, and the modulation code synthesizing units 103, respectively. Also, the transmission module 31 and the reception module 32 share the true random number sequence S316.

The synchronizing signal generation unit 312 drives the signal generation unit 300 and the signal generation unit 311 to match signal transmission timings, thereby synchronizing the transmission module 31 and the reception module 32.

Instead of the reception module 32, the transmission module 31 may include at least one of the true random number generation unit 316 and the synchronizing signal generation unit 312.

The internal structure of the signal processing device 310 is similar to that of the signal processing device 110. Thus, description of the signal processing device 310 is omitted.

The radar device 30 may be one radar device including the transmission module 31 and the reception module 32. Alternatively, the radar device 30 may be configured of a plurality of radar devices at different locations, such as a bistatic radar or multi-static radar.

*Description of Operation*

Figure 15:
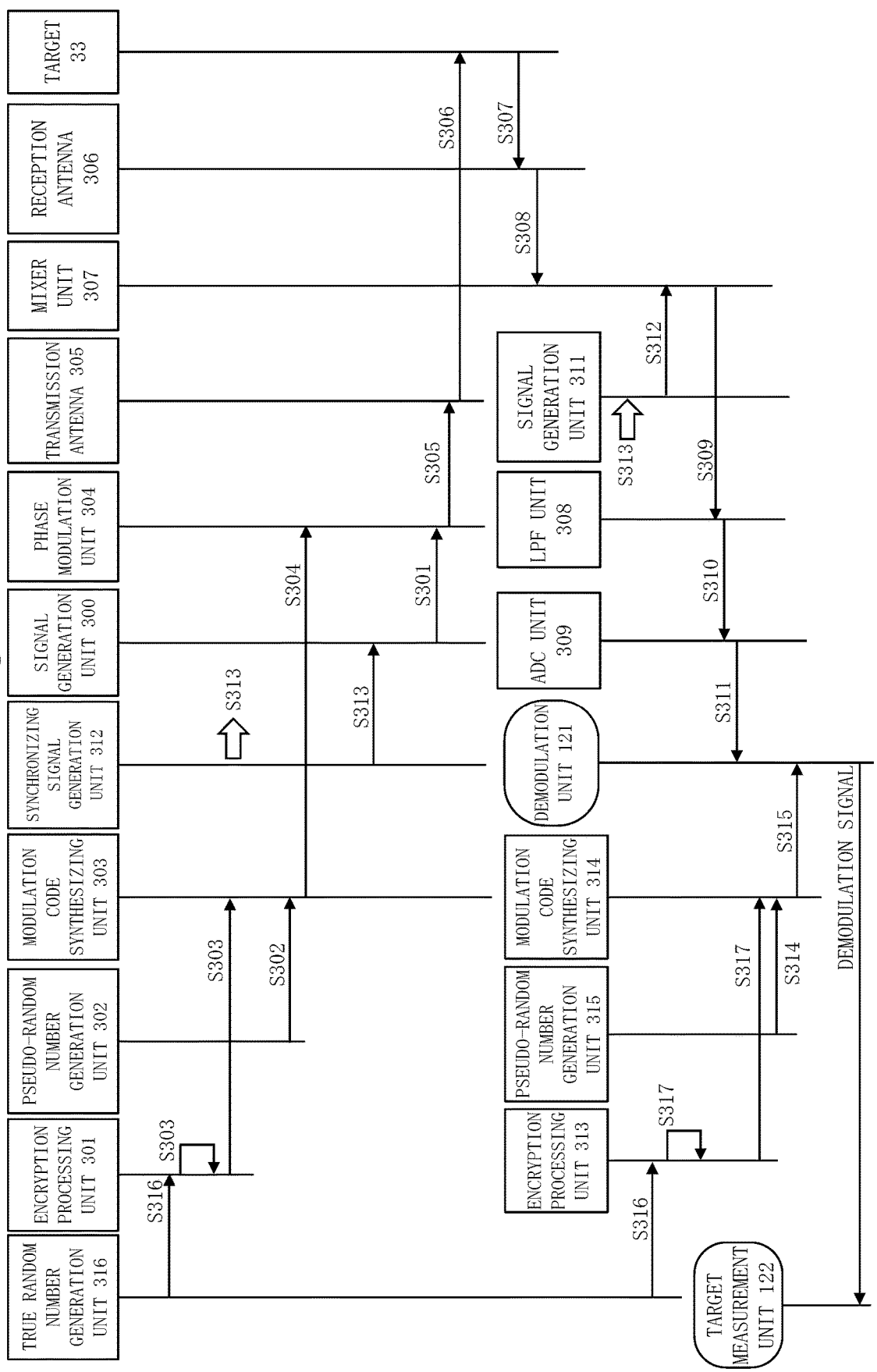
FIG. 15 is a sequence diagram illustrating the operation of the radar device 30 according to Embodiment 2.

FIG. 15 is a sequence diagram illustrating one example of operation of the radar device 30. With reference to this drawing, the operation of the radar device 30 is described.

The true random number generation unit 316 generates the true random number sequence S316, and transmits the true random number sequence S316 to the encryption processing unit 301 and the encryption processing unit 313. As a result, the encryption processing unit 301 and the encryption processing unit 313 can share the true random number sequence S316.

The true random number generation unit 316 may perform the operation described in the present paragraph once at the time of starting the radar device 30 or may repeatedly perform the operation described in the present paragraph at predetermined time intervals, such as every one sweep. Alternatively, with the demodulation unit 121 failing in demodulation as an impetus, the true random number generation unit 316 may perform the operation described in this paragraph.

The encryption processing unit 301 generates the encryption sequence S303 by encrypting plaintext M by using the true random number sequence S316, and transmits the encryption sequence S303 to the modulation code synthesizing unit 303. The encryption processing unit 313 generates the encryption sequence S317 by encrypting the plaintext M by using the true random number sequence S316, and transmits the encryption sequence S317 to the modulation code synthesizing unit 314. The plaintext M may be any plaintext and may be generated in any manner. The plaintext is unencrypted data. The encryption sequence S303 and the encryption sequence S317 are identical. The encryption processing unit 301 and the encryption processing unit 313 share the plaintext M.

When generating the encryption sequence S303 and the encryption sequence S317 for the first time, the encryption processing unit 301 and the encryption processing unit 313 use, as a specific example, an initial value shared in advance. The encryption processing unit 301 and the encryption processing unit 313 may use the true random number sequence S316 as a secret key.

The encryption processing unit 301 and the encryption processing unit 313 generate a signal sequence that is difficult to be guessed by attackers.

The encryption processing unit 301 and the encryption processing unit 313 each use, as a specific example, block encryption or stream encryption as an encryption algorithm. Block encryption is, as a specific example, AES (Advanced Encryption Standard) or Camellia (registered trademark). Stream encryption is, as a specific example, KCipher (registered trademark)-2.

As another specific example, the encryption processing unit 301 generates the encryption sequence S303 by the above-described method or the like, performs XOR operation on the generated encryption sequence S303 and the true random number sequence S316, executes a hash function by using the result of the XOR operation, and takes the result of execution of the hash function as the encryption sequence S303. In this example, the encryption processing unit 313 generates the encryption sequence S317 by performing a process similar to the process by the encryption processing unit 301 generating the encryption sequence S303. In this example, the encryption processing unit 301 and the encryption processing unit 313 share the hash function.

The pseudo-random number generation unit 302 generates the pseudo-random number sequence S302, and transmits the pseudo-random number sequence S302 to the modulation code synthesizing unit 303.

The pseudo-random number generation unit 315 generates the pseudo-random number sequence S314, and transmits the pseudo-random number sequence S314 to the modulation code synthesizing unit 314.

The modulation code synthesizing unit 303 generates the modulation code sequence S304 by using the encryption sequence S303 and the pseudo-random number sequence S302, and transmits the modulation code sequence S304 to the phase modulation unit 304.

The modulation code synthesizing unit 314 generates the modulation code sequence S315 by using the encryption sequence S317 and the pseudo-random number sequence S314, and transmits the modulation code sequence S315 to the demodulation unit 121.

As with the modulation code synthesizing unit 103, the modulation code synthesizing unit 303 and the modulation code synthesizing unit 314 each synthesize signal sequences.

The synchronizing signal generation unit 312 transmits the synchronizing signal S313 to each of the signal generation unit 300 and the signal generation unit 311. An object of transmission of the synchronizing signal S313 by the synchronizing signal generation unit 312 is to correct a synchronization shift between the signal generation unit 300 and the signal generation unit 311 operating based on oscillators different from each other. The signal generated by the signal generation unit 300 and the signal generated by the signal generation unit 311 are typically identical.

Note that the timing when the synchronizing signal generation unit 312 transmits the synchronizing signal S313 may be any. As a specific example, the synchronizing signal generation unit 312 transmits the synchronizing signal S313 at every chirp or every sweep.

The signal generation unit 300 generates the original signal S301, and transmits the original signal S301 to the phase modulation unit 304. Similarly, the signal generation unit 311 generates the original signal S312, and transmits the original signal S312 to the mixer unit 307.

The phase modulation unit 304 generates the transmission signal S305 by performing phase modulation on the original signal S301 by using the modulation code sequence S304, and transmits the transmission signal S305 to the transmission antenna 305.

As with the phase modulation unit 104, the phase modulation unit 304 performs phase modulation on the original signal S301.

The transmission antenna 305 transmits the transmission wave S306 to the outside world. The transmission wave S306 is reflected from a target 33.

The reception antenna 306 receives the reception wave S307. The reception antenna 306 converts the reception wave S307 to the reception signal S308, and transmits the reception signal S308 to the mixer unit 307.

The mixer unit 307 generates the mixer output signal S309 by performing mixing by using the reception signal S308 and the original signal S312, and transmits the mixer output signal S309 to the LPF unit 308.

The LPF unit 308 generates the beat signal S310 by extracting a low frequency wave of the mixer output signal S309, and transmits the beat signal S310 to the ADC unit 309.

The ADC unit 309 generates the digital signal S311 by converting the beat signal S310 as an analog signal to a digital signal, and transmits the digital signal S311 to the demodulation unit 121.

The demodulation unit 121 demodulates the digital signal S311 by using the modulation code sequence S315, thereby generating a demodulation signal. The demodulation signal is transmitted to the target measurement unit 122.

As with the demodulation unit 121 of the radar device 10, the demodulation unit 121 of the radar device 30 demodulates the digital signal S311.

Description of Effects of Embodiment 2

The radar device 30 according to the present embodiment has the following effects, in addition to effects equivalent to those of the radar device 10 according to Embodiment 1.

The transmission module 31 includes the encryption processing unit 301, and the reception module 32 includes the encryption processing unit 313. And, the encryption processing unit 301 and the encryption processing unit 313 each generate an encrypted signal sequence. This allows the radar device 30 to reduce the number of times of communication required to share the true random number sequence S316.

In the fast FMCW scheme, the sweeping time for a chirp of one unit is short. According to the present embodiment, the transmission module 31 and the reception module 32 can separately proceed to process. Thus, the risk, that delaying the process because of taking time for communication for sharing the true random number sequence S316, is relatively small. Therefore, the present embodiment is particularly effective in the radar device adopting the fast FMCW scheme.

*Other Structures*

Modification Example 5

When generating the encryption sequence S303 and the encryption sequence S317 for the first time, the encryption processing unit 301 and the encryption processing unit 313 may not use an initial value shared in advance.

In the present modification example, as a specific example, the encryption processing unit 301 and the encryption processing unit 313 share a random number generation algorithm, and generate a random number sequence by taking the true random number sequence S316 as a seed of a random number. The encryption processing unit 301 takes the random number sequence as the encryption sequence S303. The encryption processing unit 313 takes the random number sequence as the encryption sequence S317.

Modification Example 6

The true random number generation unit 316 may encrypt the true random number sequence S316.

In the present modification example, as a specific example, the encryption processing unit 301 and the encryption processing unit 313 share a decryption key for decoding the true random number generation unit 316, and decrypt the encrypted true random number sequence S316 by using the decryption key. In this example, the modulation code synthesizing unit 303 uses the true random number sequence S316 in place of the encryption sequence S303, and the modulation code synthesizing unit 314 uses the true random number sequence S316 in place of the encryption sequence S317. That is, the encryption sequence S303 and the encryption sequence S317 may each include the true random number sequence S316.

Modification Example 7

Figure 16:
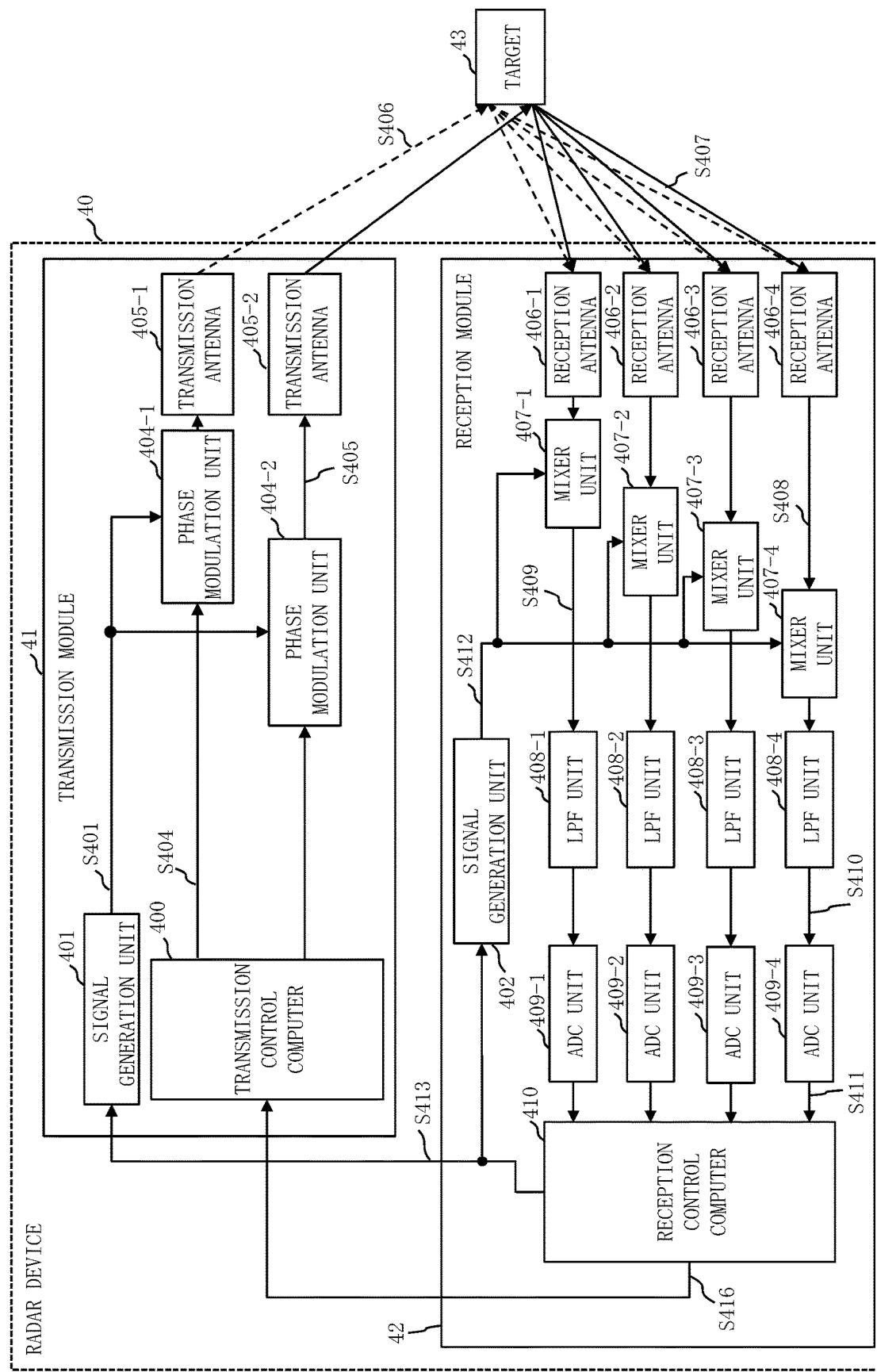
FIG. 16 illustrates an example of structure of a radar device 40 according to a modification example of Embodiment 2.

FIG. 16 illustrates an example of structure of a radar device 40. The radar device 40 has a different structure of the radar device 30.

A relation of the radar device 40 with respect to the radar device 30 is similar to a relation of the radar device 20 with respect to the radar device 10. That is, the radar device 40 is a device which implements part of the functions of the radar device 30 by using computers.

As illustrated in this drawing, the radar device 40 includes a transmission module 41 and a reception module 42 as hardware.

The transmission module 41 includes a transmission control computer 400, a signal generation unit 401, a plurality of phase modulation units 404, and a plurality of transmission antennas 405. The number of phase modulation units 404 matches the number of transmission antennas 405.

The signal generation unit 401 is equivalent to the signal generation unit 100. The phase modulation unit 404 is equivalent to the phase modulation unit 104. The transmission antenna 405 is equivalent to the transmission antenna 105.

The reception module 42 includes a signal generation unit 402, a plurality of reception antennas 406, a plurality of mixer units 407, a plurality of LPF units 408, a plurality of ADC units 409, and a reception control computer 410.

The signal generation unit 402 is equivalent to the signal generation unit 100. The reception antenna 406 is equivalent to the reception antenna 106. The mixer unit 407 is equivalent to the mixer unit 107. The LPF unit 408 is equivalent to the LPF unit 108. The ADC unit 409 is equivalent to the ADC unit 109.

An original signal S401 is similar to the original signal S301. A modulation code sequence S404 is a sequence formed of modulation codes generated by the transmission control computer 400. A transmission signal S405 is similar to the transmission signal S305. A transmission wave S406 is similar to the transmission wave S306. The number of transmission waves S406 matches the number of transmission antennas 405.

A reception wave S407 is similar to the reception wave S307. A maximum value of the number of reception waves S407 matches a number obtained by multiplying the number of transmission antennas 405 by the number of reception antennas 406. A reception signal S408 is similar to the reception signal S308. A mixer output signal S409 is similar to the mixer output signal S309. A beat signal S410 is similar to the beat signal S310. A digital signal S411 is similar to the digital signal S311. An original signal S412 is similar to the original signal S312. A synchronizing signal S413 is a signal generated by the reception control computer 410. A true random number sequence S416 is a sequence formed of signals generated by the reception control computer 410.

Figure 17:
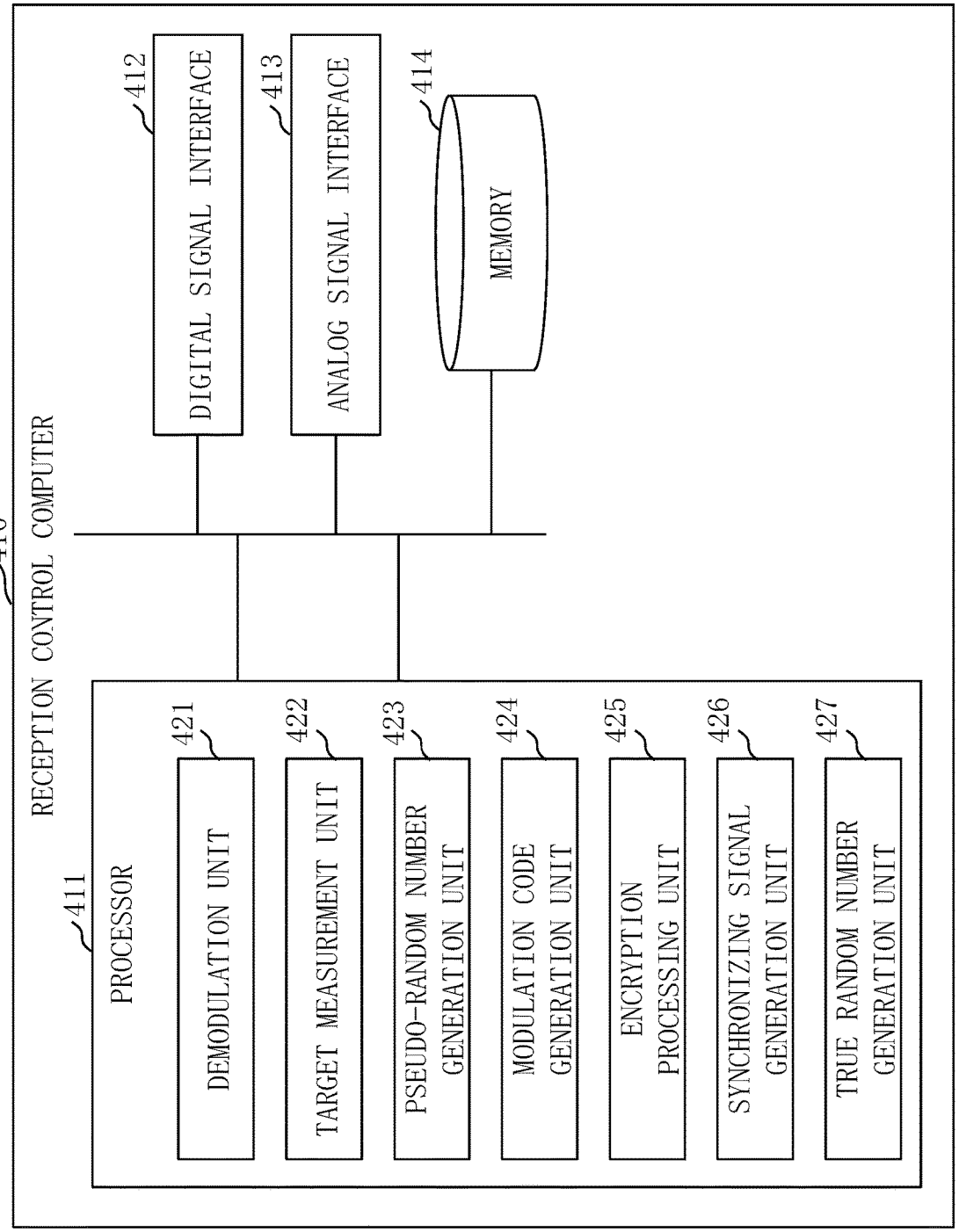
FIG. 17 illustrates an example of hardware structure of a reception control computer 410 according to the modification example of Embodiment 2.

FIG. 17 illustrates an example of hardware structure of the reception control computer 410. The reception control computer 410 is a general computer.

As illustrated in this drawing, the reception control computer 410 includes a processor 411, a digital signal interface 412, an analog signal interface 413, and a memory 414 as hardware.

Also, the reception control computer 410 includes a demodulation unit 421, a target measurement unit 422, a pseudo-random number generation unit 423, a modulation code generation unit 424, an encryption processing unit 425, a synchronizing signal generation unit 426, and a true random number generation unit 427 as functional components.

The processor 411 is equivalent to the processor 111. The memory 414 is equivalent to the memory 113.

The digital signal interface 412 is equivalent to the digital signal interface 112. The digital signal interface 412 is used to connect the ADC unit 409 and the reception control computer 410 together.

The analog signal interface 413 is, for example, a Digital-to-Analog Converter (DAC). The analog signal interface 413 is used to connect the reception control computer 410 and external hardware together. It is assumed that the synchronizing signal S413 is inputted to the signal generation unit 401 and the signal generation unit 402. Thus, the external hardware includes the signal generation unit 401 and the signal generation unit 402. The synchronizing signal S413 is, as a specific example, a reset signal, enable signal, or trigger signal.

As with the signal processing device 110, the reception control computer 410 may include an electronic circuit in place of the processor 411 or in place of the processor 411 and the memory 414.

The demodulation unit 421, the target measurement unit 422, the pseudo-random number generation unit 423, the modulation code generation unit 424, the encryption processing unit 425, the synchronizing signal generation unit 426, and the true random number generation unit 427 are implemented by a program. The program is stored in the memory 414 and is executed by the processor 411.

Figure 18:
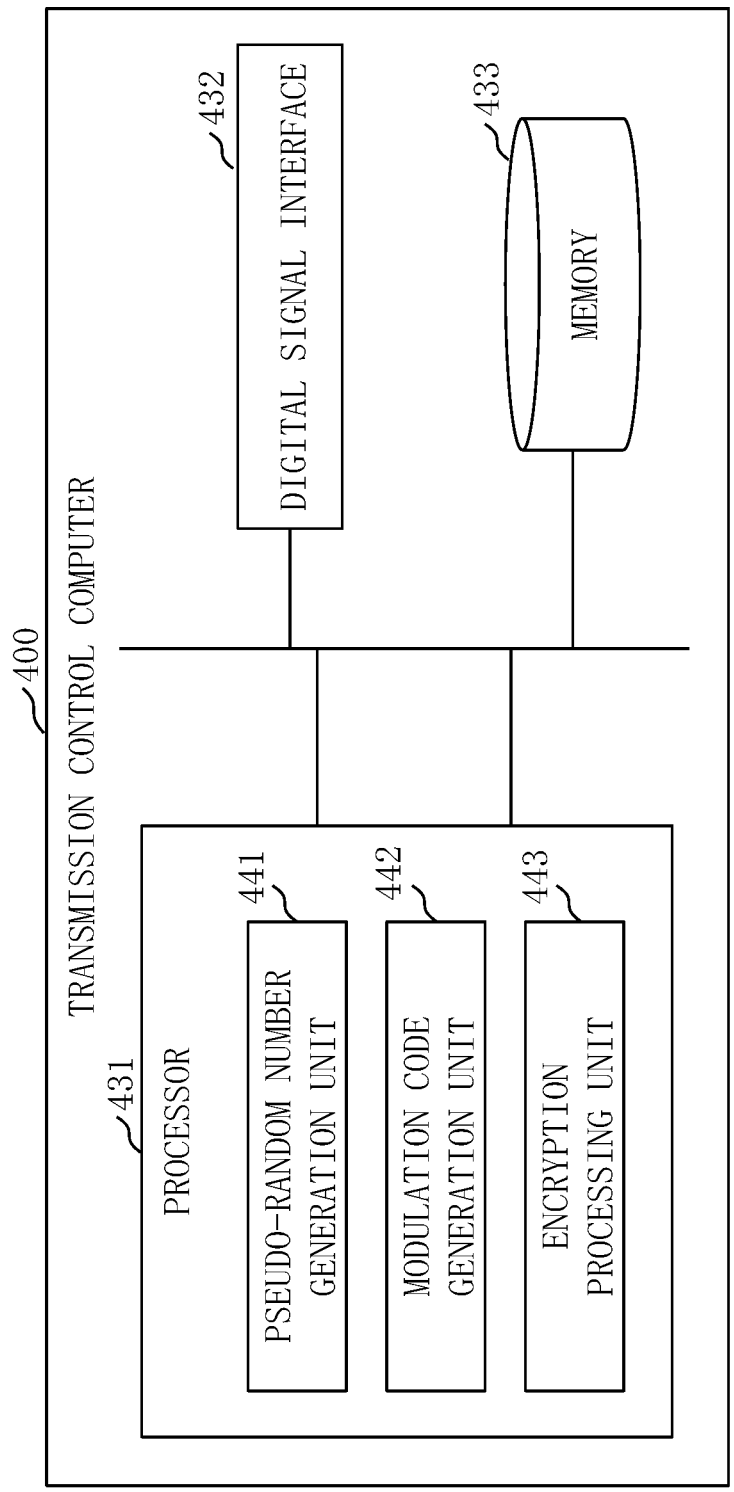
FIG. 18 illustrates an example of hardware structure of a transmission control computer 400 according to the modification example of Embodiment 2.

FIG. 18 illustrates an example of hardware structure of the transmission control computer 400. The transmission control computer 400 is a general computer.

As illustrated in this drawing, the transmission control computer 400 includes a processor 431, a digital signal interface 432, and a memory 433 as hardware.

Also, the transmission control computer 400 includes a pseudo-random number generation unit 441, a modulation code generation unit 442, and an encryption processing unit 443 as functional components.

The processor 431 is equivalent to the processor 111. The memory 433 is equivalent to the memory 113.

The digital signal interface 432 is equivalent to the digital signal interface 112. The digital signal interface 432 is used to connect the transmission control computer 400 and the phase modulation units 404 together.

As with the signal processing device 110, the transmission control computer 400 may include an electronic circuit in place of the processor 431 or in place of the processor 431 and the memory 433.

The pseudo-random number generation unit 441, the modulation code generation unit 442, and the encryption processing unit 443 are implemented by a program. The program is stored in the memory 433 and is executed by the processor 431.

The operation of the radar device 40 is described. The operation of the radar device 40 is similar to the operation of the radar device 30. The operation of the radar device 40 is similar to the operation in the sequence diagram of FIG. 15, with the true random number generation unit 316 being read as the true random number generation unit 427, the encryption processing unit 301 as the encryption processing unit 443, the encryption processing unit 313 as the encryption processing unit 425, the pseudo-random number generation unit 302 as the pseudo-random number generation unit 441, the pseudo-random number generation unit 315 as the pseudo-random number generation unit 423, the modulation code synthesizing unit 303 as the modulation code generation unit 442, the modulation code synthesizing unit 314 as the modulation code generation unit 424, the synchronizing signal generation unit 312 as the synchronizing signal generation unit 426, the signal generation unit 300 as the signal generation unit 401, the signal generation unit 311 as the signal generation unit 402, the phase modulation units 304 as the phase modulation units 404, the transmission antennas 305 as the transmission antennas 405, the target 33 as a target 43, the reception antennas 306 as the reception antennas 406, the mixer units 307 as the mixer units 407, the LPF units 308 as the LPF units 408, the ADC units 309 as the ADC units 409, the demodulation unit 121 as the demodulation unit 421, and the target measurement unit 122 as the target measurement unit 422.

The true random number generation unit 427 may perform a process similar to that of the true random number generation unit 225, thereby generating the true random number sequence S416 by using the digital signal S411.

Other Embodiments

It is possible to freely combine the above-described embodiments, modify any component in each embodiment, or omit any component in each embodiment.

Note that the above-described embodiments are intrinsically preferable examples and are not intended to restrict the present disclosure, its applications, and the scope of its use purposes.

Also, embodiments are not limited to those described in Embodiments 1 and 2 and can be variously changed as required.

REFERENCE SIGNS LIST 10, 20, 30, 40: radar device; 11, 21, 33, 43: target; 31, 41: transmission module; 32, 42: reception module; 15, 25: transmission unit; 16, 26: reception unit; 100, 201, 300, 311, 401, 402: signal generation unit; 101, 316: true random number generation unit; 102, 302, 315: pseudo-random number generation unit; 103, 303, 314: modulation code synthesizing unit; 104, 202, 304, 404: phase modulation unit; 105, 203, 305, 405: transmission antenna; 106, 204, 306, 406: reception antenna; 107, 205, 307, 407: mixer unit; 108, 206, 308, 408: LPF unit; 109, 207, 309, 409: ADC unit; 110, 310: signal processing device; 200: computer; 301, 313: encryption processing unit; 312: synchronizing signal generation unit; 400: transmission control computer; 410: reception control computer; 111, 211, 411, 431: processor; 112, 212, 412, 432: digital signal interface; 113, 213, 414, 433: memory; 114: electronic circuit; 413: analog signal interface; 121, 221, 421: demodulation unit; 122, 222, 422: target measurement unit; 223, 423, 441: pseudo-random number generation unit; 224, 424, 442: modulation code generation unit; 225, 427: true random number generation unit; 425, 443: encryption processing unit; 426: synchronizing signal generation unit; S101, S201, S301, S312, S401, S412: original signal; S102, S316, S416: true random number sequence; S103, S302, S314: pseudo-random number sequence; S104, S204, S304, S315, S404: modulation code sequence; S105, S205, S305, S405: transmission signal; S106, S206, S306, S406: transmission wave; S107, S207, S307, S407: reception wave; S108, S208, S308, S408: reception signal; S109, S209, S309, S409: mixer output signal; S110, S210, S310, S410: beat signal; S111, S211, S311, S411: digital signal; S303, S317: encryption sequence; S313, S413: synchronizing signal

The invention claimed is:

1. A radar device comprising:
a signal generation unit being a circuit configured to generate a signal as an original signal;
at least one pseudo-random number generation unit, each of the at least one pseudo-random number generation unit being a circuit, configured to generate a pseudo-random number sequence formed of a pseudo-random number of one bit or more;
a true random number generation unit being a circuit configured to generate a true random number sequence formed of a true random number of one bit or more;
at least one modulation code synthesizing unit, each of the at least one modulation code synthesizing unit being a circuit, configured to generate a modulation code sequence for use in modulating a signal phase by synthesizing the pseudo-random number sequence and the true random number sequence, the modulation code sequence including a component derived from the true random number sequence;
at least one phase modulation unit, each of the at least one phase modulation unit being a circuit, configured to generate a transmission signal by modulating a phase of the original signal by using the modulation code sequence, wherein
the modulation code sequence is a modulation code sequence in which the component derived from the true random number sequence disappears by synthesizing two modulation code sequences.

2. The radar device according to claim 1, wherein
the modulation code synthesizing unit is configured to generates the modulation code sequence by performing exclusive OR operation or exclusive NOR operation.

3. The radar device according to claim 1, comprising:
at least one transmission antenna configured to convert the transmission signal to a transmission wave and to transmit the transmission wave;
at least one reception antenna configured to receive a reception wave corresponding to the transmission wave and to convert the reception wave to a reception signal;
the at least one mixer unit, each of the at least one mixer unit being a circuit, configured to generate a mixer output signal by mixing the original signal and the reception signal;
at least one low-pass filter unit, each of the at least one low-pass filter unit being a circuit, configured to generate a beat signal by extracting a low frequency wave of the mixer output signal; and
processing circuitry configured to demodulate the beat signal by using the modulation code sequence, wherein
the number of the at least one pseudo-random number generation unit, the number of the at least one modulation code synthesizing unit, and the number of the at least one phase modulation unit each match the number of the at least one transmission antenna, the number of the at least one mixer unit and the number of the at least one low-pass filter unit each match the number of the at least one reception antenna, and the true random number generation unit is configured to generate the true random number based on the beat signal.

4. The radar device according to claim 1, comprising:

at least one transmission antenna to convert the transmission signal to a transmission wave and to transmit the transmission wave;

at least one reception antenna to receive a reception wave corresponding to the transmission wave and to convert the reception wave to a reception signal;

at least one mixer unit, each of the at least one mixer unit being a circuit, configured to generate a mixer output signal by mixing the transmission signal and the reception signal; and at least one low-pass filter unit, each of the at least one low-pass filter unit being a circuit, configured to generate a beat signal by extracting a low frequency wave of the mixer output signal, wherein the number of the at least one pseudo-random number generation unit, the number of the at least one modulation code synthesizing unit, and the number of the at least one phase modulation unit each match the number of the at least one transmission antenna, and the number of the at least one mixer unit and the number of the at least one low-pass filter unit each match the number of the at least one reception antenna.

5. A radar device comprising:

a transmission module including
 a transmission-side signal generation unit being a circuit configured to generate a signal as a transmission-side original signal,
 at least one transmission-side pseudo-random number generation unit, each of the at least one transmission-side pseudo-random number generation unit being a circuit, configured to generate a transmission-side pseudo-random number sequence formed of a pseudo-random number of one bit or more,
 a transmission-side encryption processing unit being a circuit configured to receive a true random number sequence formed of a true random number of one bit or more and to generate a transmission-side encryption sequence, which is a signal sequence of encryption, by using the true random number sequence,
 at least one transmission-side modulation code synthesizing unit, each of the at least one transmission-side modulation code synthesizing unit being a circuit, configured to generate a transmission-side modulation code sequence for use in modulating a signal phase by synthesizing the transmission-side pseudo-random number sequence and the transmission-side encryption sequence, the transmission-side modulation code sequence including a component derived from the transmission-side encryption sequence, and
 at least one phase modulation unit, each of the at least one phase modulation unit being a circuit, configured to generate a transmission signal by modulating a phase of the transmission-side original signal by using the transmission-side modulation code sequence; and a reception module including
 a reception-side signal generation unit being a circuit configured to generate a signal corresponding to the transmission-side original signal as a reception-side original signal,
 at least one reception-side pseudo-random number generation unit, each of the at least one reception-side pseudo-random number generation unit being a circuit, configured to generate a reception-side pseudo-random number sequence formed of a pseudo-random number of one bit or more,
 a reception-side encryption processing unit being a circuit configured to receive the true random number sequence and to generate a reception-side encryption sequence, which is a signal sequence of encryption, by using the true random number sequence,
 at least one reception-side modulation code synthesizing unit, each of the at least one reception-side modulation code synthesizing unit being a circuit, configured to generate a reception-side modulation code sequence, by synthesizing the reception-side pseudo-random number sequence and the reception-side encryption sequence, for use in modulating a signal phase, the reception-side modulation code sequence including a component derived from the reception-side encryption sequence,
 at least one mixer unit, each of the at least one mixer unit being a circuit, configured to receive a signal as a reception signal and to generate a mixer output signal by mixing the reception-side original signal and the reception signal,
 at least one low-pass filter unit, each of the at least one low-pass filter unit being a circuit, configured to generate a beat signal by extracting a low frequency wave of the mixer output signal, and
 processing circuitry configured to demodulate the beat signal by using the reception-side modulation code sequence, wherein two said transmission-side modulation code sequences are transmission-side modulation code sequences in which a component derived from the transmission-side encryption sequence disappears by synthesizing two transmission-side modulation code sequences, two said reception-side modulation code sequences are reception-side modulation code sequences in which a component derived from the reception-side encryption sequence disappears by synthesizing two reception-side modulation code sequences, the number of the at least one transmission-side pseudo-random number generation unit, the number of the at least one reception-side pseudo-random number generation unit, the number of the at least one transmission-side modulation code synthesizing unit, the number of the at least one reception-side modulation code synthesizing unit, and the number of the at least one phase modulation unit each match the number of the at least one transmission antenna, and the number of the at least one mixer unit and the number of the at least one low-pass filter unit each match the number of the at least one reception antenna.

6. The radar device according to claim 5, wherein the reception module includes a synchronizing signal generation unit being a circuit configured to generate a synchronizing signal for use in signal synchronization and to transmit the synchronizing signal to the transmission module, the transmission-side signal generation unit is configured to synchronizes the transmission-side original signal with the reception-side original signal by using the synchronizing signal, and the reception-side signal generation unit is configured to synchronizes the reception-side original signal with the transmission-side original signal by using the synchronizing signal.

7. The radar device according to claim 5, wherein the transmission-side modulation code synthesizing unit is configured to generates the transmission-side modulation code sequence by performing exclusive OR operation or exclusive NOR operation, and the reception-side modulation code synthesizing unit is configured to generates the reception-side modulation code sequence by performing exclusive OR operation or exclusive NOR operation.

8. The radar device according to claim 5, wherein the reception module includes a true random number generation unit being a circuit configured to generate the true random number sequence and to transmit the true random number sequence to the transmission module.

9. The radar device according to claim 3, wherein the true random number generation unit is configured to generates a true random number of one bit by converting an extreme value of the beat signal to a binary number.

10. The radar device according to claim 4, wherein the true random number generation unit is configured to generates a true random number of one bit by converting an extreme value of the beat signal to a binary number.

11. The radar device according to claim 8, wherein the true random number generation unit is configured to generates a true random number of one bit by converting an extreme value of the beat signal to a binary number.

12. The radar device according to claim 3, wherein the radar device includes a plurality of said low-pass filter units, and the true random number generation unit is configured to generates random number bits, each of the random number bits being generated by using each of beat signals respectively corresponding to each of the plurality of said low-pass filter units, each of the random number bits respectively corresponding to each of the plurality of said low-pass filter units included in the radar device, and generates a true random number of one bit by performing exclusive OR operation or exclusive NOR operation by using the generated random number bits.

13. The radar device according to claim 4, wherein the radar device includes a plurality of said low-pass filter units, and the true random number generation unit is configured to generates random number bits, each of the random number bits being generated by using each of beat signals respectively corresponding to each of the plurality of said low-pass filter units, each of the random number bits respectively corresponding to each of the plurality of said low-pass filter units included in the radar device, and generates a true random number of one bit by performing exclusive OR operation or exclusive NOR operation by using the generated random number bits.

14. The radar device according to claim 8, wherein the radar device includes a plurality of said low-pass filter units, and the true random number generation unit is configured to generates random number bits, each of the random number bits being generated by using each of beat signals respectively corresponding to each of the plurality of said low-pass filter units, each of the random number bits respectively corresponding to each of the plurality of said low-pass filter units included in the radar device, and generates a true random number of one bit by performing exclusive OR operation or exclusive NOR operation by using the generated random number bits.

15. A non-transitory computer-readable recording medium recorded with a radar operation program that causes a computer to:

generate a signal as an original signal;

generate a pseudo-random number sequence formed of a pseudo-random number of one bit or more;

generate a true random number sequence formed of a true random number of one bit or more;

generate a modulation code sequence for use in modulating a signal phase by synthesizing the pseudo-random number sequence and the true random number sequence, the modulation code sequence including a component derived from the true random number sequence; and generate a transmission signal by modulating a phase of the original signal by using the modulation code sequence;

wherein the modulation code sequence is a modulation code sequence in which the component derived from the true random number sequence disappears by synthesizing two modulation code sequences.

* * * * *